(12) United States Patent
Tanaka

(10) Patent No.: US 6,753,936 B2
(45) Date of Patent: Jun. 22, 2004

(54) FIELD SEQUENTIAL COLOR LIQUID CRYSTAL DISPLAY DEVICE

(75) Inventor: Tomio Tanaka, Tokyo (JP)

(73) Assignee: Dai Nippon Pringing Co., Ltd., Tokyo (JP)

( * ) Notice: Subject to any disclaimer, the term of this patent is extended or adjusted under 35 U.S.C. 154(b) by 17 days.

(21) Appl. No.: 10/144,554

(22) Filed: May 13, 2002

(65) Prior Publication Data

US 2003/0053013 A1 Mar. 20, 2003

(30) Foreign Application Priority Data

May 17, 2001 (JP) .......................................... 2001-147505
Jan. 15, 2002 (JP) .......................................... 2002-006544

(51) Int. Cl.[7] ............................. G02F 1/333; G02F 1/335
(52) U.S. Cl. ........................ 349/106; 349/113; 349/119
(58) Field of Search ................................ 349/106, 119, 349/113

(56) References Cited

U.S. PATENT DOCUMENTS 5,999,282 A * 12/1999 Suzuki et al. ................. 359/20
6,593,985 B1 * 7/2003 Taira et al. ................. 349/119

FOREIGN PATENT DOCUMENTS

JP 355166617 A * 12/1980

* cited by examiner

*Primary Examiner*—Julie Huyen L. Ngo
(74) *Attorney, Agent, or Firm*—Timothy J. Keefer; Seyfarth Shaw LLP

(57) ABSTRACT

A reflection type color liquid crystal display device includes a liquid crystal cell controlled by a new field sequential method and a reflection device disposed at the rear surface of the cell. The device includes a band-like reflection sheet having reflection regions for reflecting the three-color lights of yellow, magenta and cyan. The reflection sheet is driven by a driving device, whereby the reflection regions are sequentially moved to the reverse side of the liquid crystal cell. In synchronism with the color changes of these reflection regions, the liquid crystal cell is controlled so that its light transmittance may be controlled in the way of color filters controlling the three picture elements of yellow, magenta, and cyan, simultaneously and time-sequentially three times. As a result of this 3-time time-sequential display, the desired color is displayed by the additive color process.

16 Claims, 18 Drawing Sheets

19Y, 19M, 19C COLORED LAYERS 36Y, 36M, 36C REFLECTION REGION

Ta EMITTED LIGHT
Ra INCIDENT LIGHT (EXTERNAL LIGHT)
7b TRANSMITTED COLORED LIGHT
8b REFLECTED COLORED LIGHT

FIG. 22

| AMBIENT LIGHTNESS | DARK | LIGHT |
|---|---|---|
| LIGHTING UP /TURNING OFF OF BACK LIGHT SOURCE | LIGHT UP | TURN OFF |
| LIGHT USED | TRANSMITTED COLORED LIGHT FROM BACK LIGHT SOURCE | REFLECTED COLORED LIGHT OF EXTERNAL LIGHT |
| KIND OF REGION USED | ○ ○ ○ × × × | × × × ○ ○ ○ |

( ○ COLOR REGION
× SHADED COLORED LIGHT REGION )

- 132R
- 132G
- 132B
- 134R
- 134G
- 134B 138 (SEMI-TRANSMISSION/SEMI-REFLECTION FILM)

FIELD SEQUENTIAL COLOR LIQUID CRYSTAL DISPLAY DEVICE

BACKGROUND OF THE INVENTION

1. Field of the Invention

The present invention relates to a new field sequential type color liquid crystal display device.

2. Description of the Related Art

In recent years, with an aim to save its energy, reduce its cost, and improve its resolution, there has been proposed a color liquid crystal display device that uses a field sequential method.

The color liquid crystal display principle based on the use of the field sequential method is the one wherein a liquid crystal display (hereinafter "LCD") is used as a light shutter. By using a light source that is being lit, a light is sequentially radiated onto the LCD from the rear surface side of it while the lightness color of the light is being changed over with a high speed.

However, the above-described field sequential type color liquid crystal display device needs to be sequentially radiated, as described above, by means of the lighted-up light source from the rear surface of the LCD. It therefore had the problem that the power consumption resulting from the use of the light source is high, with the result that the device could not be applied to the liquid crystal display devices that had been constructed as battery-driven portable electronic appliances.

Also, the use of a reflection type liquid crystal display device using no light sources, i.e. having no power consumption resulting from the light source can be considered available.

Ordinarily, a color liquid crystal display element is of a micro color filter type having a construction of R (red), G (green), and B (blue). This micro color filter has a high light absorbance. Therefore, when an external light passes the micro color filter and is reflected by a reflection plate on the rear side of the liquid crystal cell and again passes through the micro color filter, the quantity of the light decreases down to $\frac{1}{3}$ or less of the quantity of incident light. Further, from that value, the light has its half absorbed by the polarizing plate. Therefore, in the conventional reflection type liquid crystal display element, there is the problem that it is difficult to form a light image.

Especially, in the case of the reflection type liquid crystal display element, display of the white color is dark and therefore, for example, when letters are displayed as the black color, since the reflectance of the background white is low, the contrast is low. This posed the problem that the display is difficult to view.

SUMMARY OF THE INVENTION

The present invention has been made in view of the conventional points in problem and an object thereof is to provide a reflection type color liquid crystal display device whose power consumption is made small, and whose white display is made light, and a semi-transmission/semi-reflection type color liquid crystal display device whose light display on screen is possible, by using a new field sequential method.

The inventor of this application has been found out that a new field sequential system of reflection type color liquid crystal display device can be constructed by previously keeping the liquid crystal display element, for which a color filter having a construction of Y (Yellow), M (magenta), and C (cyan) is used, able to make the intended color display by controlling the picture elements of YMC in the way of simultaneously controlling these three picture elements and, on a time-sequential basis, controlling the respective transmittances thereof three times and, further, by, with the element being kept in that condition, incorporating a reflection sheet having per-color-reflection reflection regions on the rear surface side of that liquid crystal display element, namely on the backside of the LCD and moving it in synchronism with the changeover of the display of the color of the liquid crystal.

The object of the present invention is attained by a color liquid crystal display device comprising: a liquid crystal cell the pixel of which is constructed in the way of including three picture elements respectively having color filters of yellow, magenta, and cyan and in which in units of a pixel the light transmittances of these three picture elements are controlled, per frame of a screen to be displayed, simultaneously per three picture elements, and time-sequentially at least three times and which makes color display by the additive color process of that time-sequentially 3-time displayed colors; and a reflection device that is disposed at the position where the light passing through this liquid crystal cell goes in, where the reflection device includes a reflection sheet having three-color reflection regions arranged to reflect the color lights corresponding to the yellow, magenta, and cyan of the one frame and a driving device that drives this reflection sheet, sequentially in synchronism with the 3-time displays made by the picture elements in the liquid crystal cell, so as, with a combination of three time periods-a first time period in which the reflected light of yellow is combined with the transmittances of the three picture elements of yellow, magenta, and cyan in the liquid crystal cell; a second time period in which the reflected light of magenta is combined with the transmittances of the three picture elements of yellow, magenta, and cyan in the liquid crystal cell; and a third time period in which the reflected light of cyan is combined with the transmittances of the three picture elements of yellow, magenta, and cyan in the liquid crystal cell, to sequentially move that reflection sheet to the position of its selectively directing the incident light toward the liquid crystal cell.

Further, the present inventor has been found out that a field sequential system of semi-transmission/semi-reflection type color liquid crystal display device can be constructed by incorporating a semi-transmission/semi-reflection film having per-color transmission and reflection regions into the rear surface side of the LCD and further radiating light from the rear surface of that film and, in synchronism with the changeover of dark and light patterns corresponding to respective displayed colors of the LCD, moving that film.

The object of the present invention is attained by a semi-transmission/semi-reflection type color liquid crystal display device comprising a field sequential type of liquid crystal cell in which, per picture element, correspondingly to two or more pieces of colors in one frame of the screen to be displayed, the light transmittances are sequentially controlled and a semi-transmission/semi-reflection device that is disposed at the position where the external light passing through this liquid crystal cell goes in, where the semi-transmission/semi-reflection device includes a semi-transmission/semi-reflection film that includes two or more color regions colored to colors corresponding to the 1-frame displayed colors and the color regions of that have transmission and reflection regions, a light source that is disposed between the semi-transmission/semi-reflection film and the liquid crystal cell and that is disposed at the position of its radiating light to the liquid crystal cell from the rear surface of it, and a driving device that drives the semi-transmission/semi-reflection film so as, in synchronism with the timings with which to control the picture elements of the liquid crystal cell in the sequential order of colors, to sequentially move that film to the position of causing the two or more color regions to selectively transmit the outgoing light emitted from the light source in the direction directed toward the liquid crystal cell and causing those regions to reflect the incident light toward the liquid crystal cell.

BRIEF DESCRIPTION OF THE DRAWINGS

FIG. 22 is a developed view illustrating the semi-transmission/semi-reflection film according to a sixth embodiment of the present invention.

DESCRIPTION OF THE PREFERRED EMBODIMENTS (First Embodiment: Reflection Type Color Liquid Crystal Display Device)

Hereinafter, a reflection type liquid crystal display device according to a first embodiment of the present invention will be explained with reference to the accompanying drawings.

Figure 1:
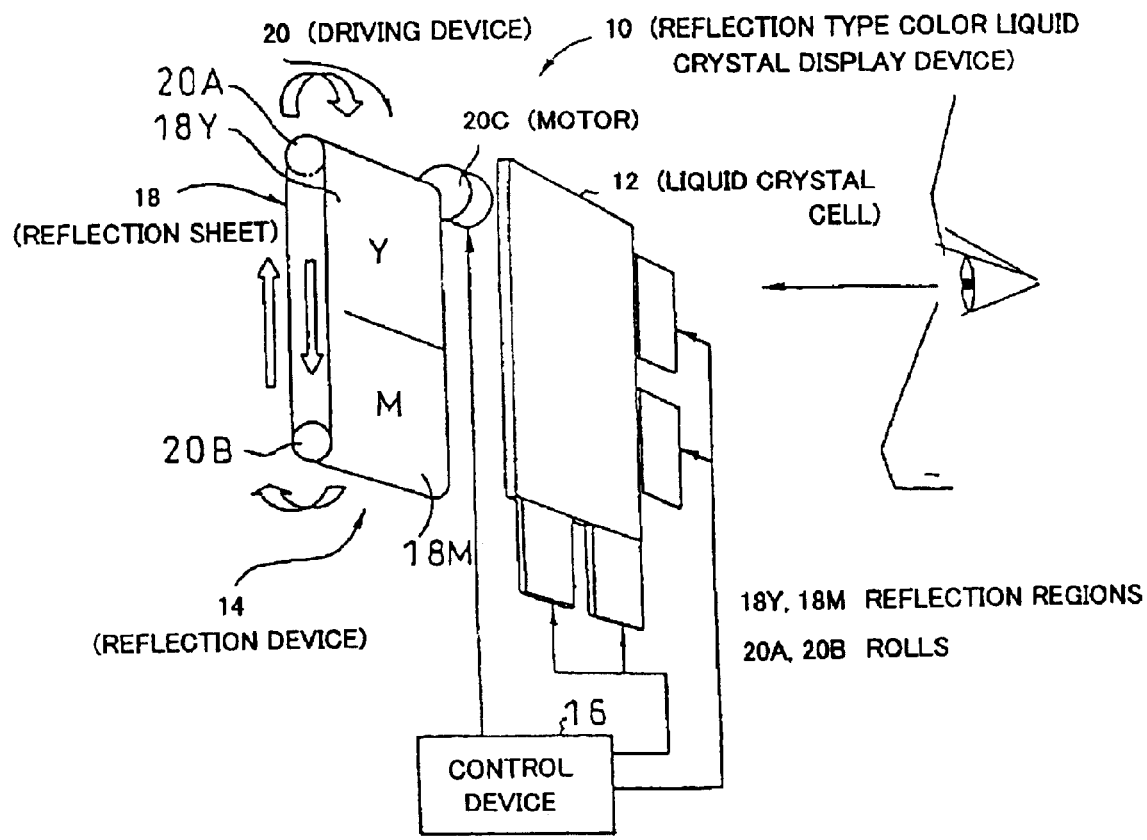
FIG. 1 is a schematic exploded perspective view illustrating a reflection type color liquid crystal display device according to a first embodiment of the present invention.
Figure 2:
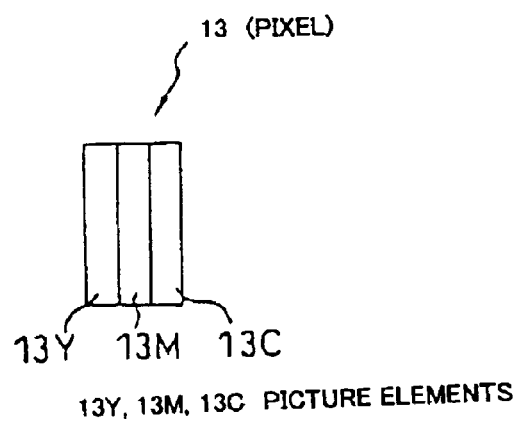
FIG. 2 is a schematic enlarged plan view illustrating the construction of a pixel used for display made by the liquid crystal in the reflection type color liquid crystal display device.

As illustrated in FIG. 1, a reflection type color liquid crystal display device 10 according to the first embodiment is constructed in the way of including a new field sequential system of liquid crystal cell 12 one pixel (see FIG. 2) of that is comprised of three picture elements 13Y, 13M, and 13C having color filters of Y (yellow), M (magenta), and C (cyan) and a reflection device 14 that is disposed at the rear surface of the liquid crystal cell 12 so that the light passing through that liquid crystal cell 12 may go in.

The liquid crystal cell 12 is the one that performs color display through the use of a control device 16 by a new field sequential (picture-element sequential display) method proposed by the inventor of this application, namely by the method of mixing colors using micro time differences.

Specifically, one frame of a screen to be displayed is divided into three fields (images), and these fields are changed over with a high speed to construct one piece of color image, while changing over the light transmittances of the three picture elements of YMC, simultaneously, and changing over the combinations of the 1-frame three picture elements, each per field, in turn.

Accordingly, although, momentarily in terms of time, only an image the color of that is different from the object color is displayed, if the repeated speed of the field is high enough not to have it recognized as flickering, the colors are mixed due to the afterimage phenomenon of the retina, whereby the images are recognized as one piece of color image.

The monochromatic lights of YMC that are incident upon the liquid crystal cell 12 from the rear surface thereof are formed by the reflection device 14 and the respective color lights are sequentially reflection-formed in match with the changeover timings for the three fields in the liquid crystal cell 12.

Figure 3:
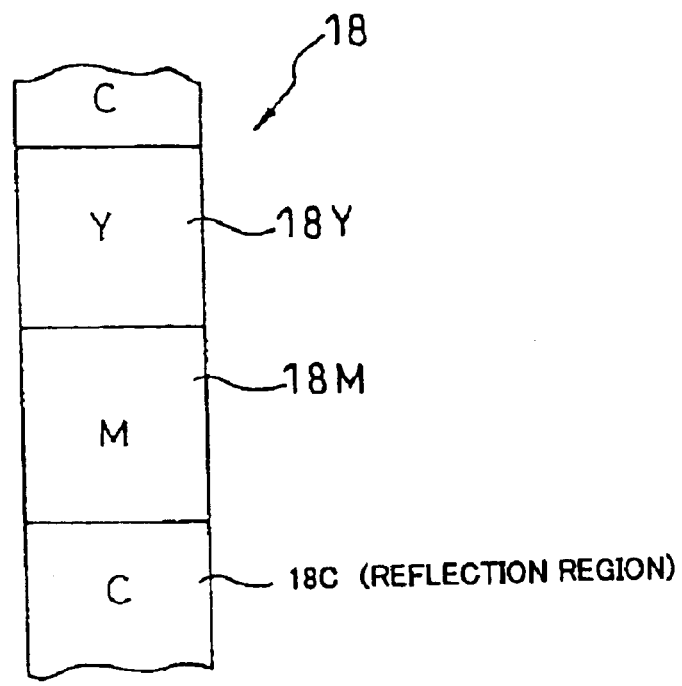
FIG. 3 is a developed view of the reflection sheet in the reflection type color liquid crystal display device.

The reflection device 14 is constructed in the way of including a reflection sheet 18 (see FIG. 3) shaped like an endless band and divided, in terms of its colors, into three reflection regions 18Y, 18M, and 18C, a pair of rolls 20A and 20B for driving that reflection sheet 18 with it being stretched between and over the rolls, and a motor 20C for driving at least one of the paired rolls.

The motor 20 is controlled by a control device 16 so as, within the field changeover speed range in the liquid crystal cell 12, to sequentially locate the reflection regions 18Y, 18M, and 18C at the rear surface of the liquid crystal cell 12. The changeover of the fields in the liquid crystal cell 12 is controlled in synchronism with the changeover speed for the reflection regions 18Y, 18M, and 18C.

Figure 4:
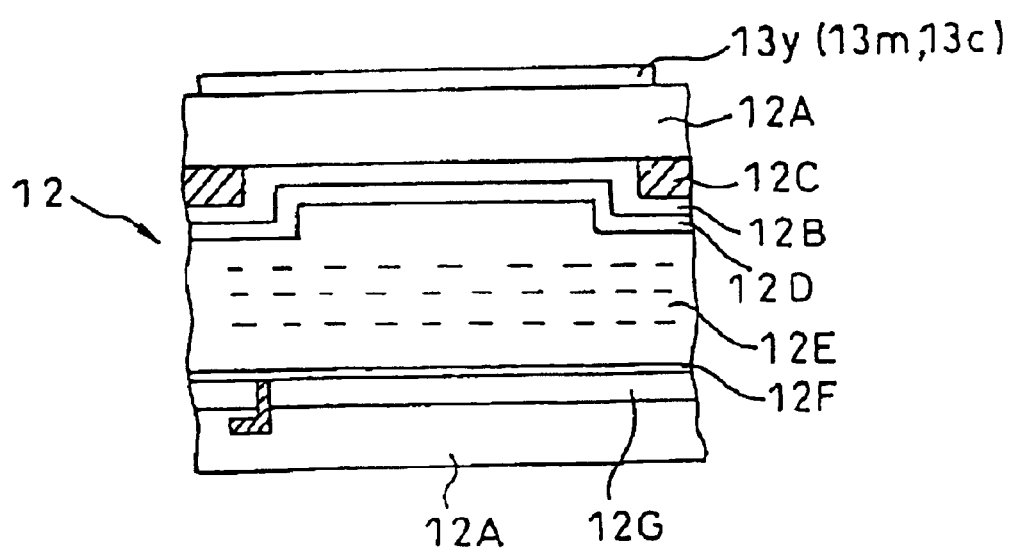
FIG. 4 is an enlarged sectional view of one picture element in the liquid crystal cell in the reflection type color liquid crystal display device.

The liquid crystal cell 12, as a part of it being illustrated in FIG. 4 on an enlarged scale, is constructed in the way of being equipped, from the viewing side, with a display side transparent substrate 12A, a transparent common electrode 12B, a black mask 12C formed between the outer-peripheral part of each picture element of this transparent common electrode and the display side transparent substrate 12A, an orientation film 12D, a liquid crystal layer 12E, an opposite-side orientation film 12F that clamps this liquid crystal layer 12E together with the orientation film 12D, a picture-element electrode 12G for supporting the orientation film 12F, and a flattened film 12H for supporting the picture element 12G, with color filters 13Y, 13M, and 13C being provided on the transparent substrate 12A.

Incidentally, this liquid crystal cell 12 is not limited to the construction of FIG. 4 but may be constructed using the elements of other known techniques. Although the pixel 13 is constructed of the stripe-like picture elements 13Y, 13M, and 13C, these picture elements may be arrayed on a mosaic-disposition, or triangle-disposition, basis.

Figure 5:
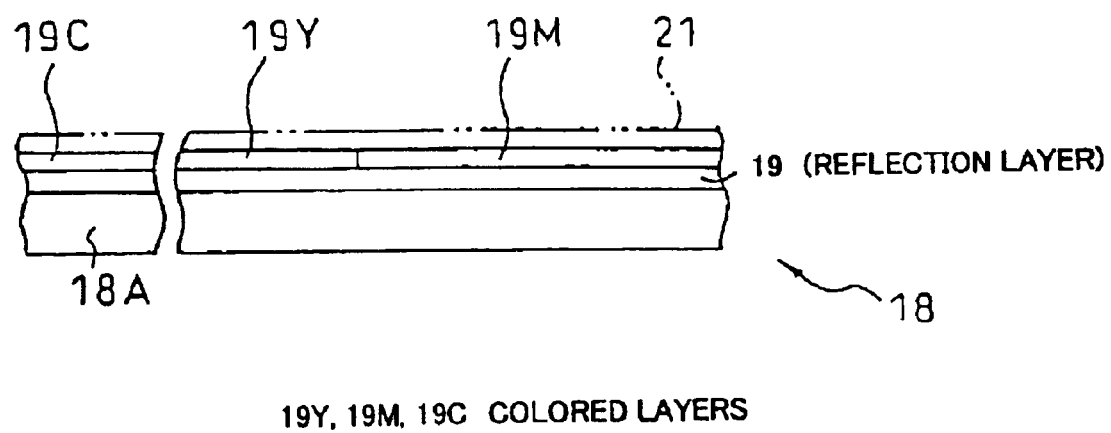
FIG. 5 is an enlarged sectional view of part of the reflection sheet in the liquid crystal cell in the reflection type color liquid crystal display device.

The reflection sheet 18 in the reflection device 14 is formed in the way of, as illustrated in FIG. 5, including a base member 18A such as a resin film or a metal film and having on it a reflection layer 19 and colored layers 19Y, 19M, and 19C in this order. For the material of the base member 18A, there is used a plastic film such as a polyethylene terephthalate (PET) film, polyester film, polycarbonate film, polyacrylic film, polyolefin, etc., aluminum, or steel. The thickness of this base member 18 preferably is from 10 $\mu$m to 5 mm though not particularly limited.

When the thickness of the base member 18A is less than 10 $\mu$m, during continuous rotation (movement) the resistance to scratch thereof, and, on the other hand, when that thickness is more than 5 mm, the rigidity becomes excessively increased with the result that the rotation fails to be smoothly performed.

The reflection layer 19 formed on the base member 18A is formed by a metal of a high reflectance such as aluminum or silver being treated by a physical vapor deposition (PVD) method. As the PVD method, it is suitably selected from ordinary means for forming a metal thin film, such as a vacuum deposition method, sputtering method, or ion plating method. Also, the reflection layer 19 may be formed by being laminated into a multi-layer structure. Here, the thickness of the reflection layer 19 enables obtaining a sufficiently high reflectance if to an extent of 50 nm to 100 nm or so.

As illustrated in FIG. 5, on the reflection layer 19, the colored layers 19Y, 19M, and 19C are formed so that prescribed color lights may be reflected by them. A concrete coloring method is similar to a conventional coloring method used for coloring color filters. Namely, means such as a staining technique or dispersion method is used therefor.

Also, in a case where having formed the light reflection layer by the PVD such as a deposition method, in order to prevent the deterioration of this reflection layer, as indicated in a two-dot and dash line in FIG. 5, it is preferable to provide a protection layer 21 that consists of a coating film such as that made of acrylic resin, epoxy resin, polyester resin, urethane resin, or alkyd resin, on the reflection layer 19 and the colored layers 19Y, 19M, and 19C. This coating preferably is performed by roll-coating, photogravure coating, or spray coating. Further, a thin film of inorganic material such as that made of silicon oxide can be also used as the protection film.

Since, as described later, the response time length needs to be made 2 to 3 ms or less, and since a high-speed switching transistor such as polysilicon preferably is used for the TFT, a high-speed response liquid crystal such as an OCB (Optically Compensated Birefringence) liquid crystal, cholesteric liquid crystal, or ferroelectric liquid crystal is preferable as the kind of the liquid crystal used for the liquid crystal layer 12E in the liquid crystal cell 12.

In the case of the field sequential display, in order to prevent the occurrence of flickering in the screen, the field time period needs to be made 17 ms ($\frac{1}{60}$ sec) or less and this time period is used for display by being divided into three equal parts. Therefore, the display time period for one of the respective reflection regions 18Y, 18M, and 18C needs to be set 6 ms or less.

Incidentally, the movement speed of the reflection regions 18Y, 18M, and 18C is proportionate to the size of the entire viewing screen in the liquid crystal cell 12 and is in inverse proportion to the length in the movement direction of each of the respective reflection regions 18Y, 18M, and 18C.

Also, the movement direction of the reflection regions 18Y, 18M, and 18C of the reflection sheet 18 may be any one of the up-and-down direction, left-and-right direction, and oblique direction with respect to the liquid crystal cell (the screen).

In the reflection type color liquid crystal display device 10 according to the first embodiment, in the reflection device 14, the reflection sheet 18 is arranged so that the reflection regions 18Y, 18M, and 18C are rotated in a prescribed direction with a prescribed speed by the driving device 20. In synchronism with this, the liquid crystal cell 12 is controlled by the control device 16 so that, when a picture element therein is located in front of any one of the reflection regions 18Y, 18M, and 18C, that picture element may be displayed.

Accordingly, at the above-described intervals of 17 ms or less, the reflection regions 18Y, 18M, and 18C are sequentially moved and, in synchronism with the Y, M, or C color of the reflected light that is coming from the reflection sheet at this time, the transmittances of the three picture elements 13Y, 13M, and 13C in the liquid crystal cell 12 are controlled, each, simultaneously, and are sequentially displayed three times. By this, the light entering the liquid crystal cell 12 from the surface thereof passes through the liquid crystal cell 12, then is reflected by any one of the reflection regions 18Y, 18M, and 18C to become a colored light, then passes through the liquid crystal cell 12 again, and then these color lights sequentially display their colors.

On the viewer side, during the field time period of $\frac{1}{60}$ sec or less, the color lights from the picture elements 13Y, 13M, and 13C are displayed, simultaneously, and sequentially three times and, as a result, the colors are mixed together using micro time differences and due to the afterimage phenomenon of the retina. Thereby those color lights are recognized as one piece of color image.

This will now be explained using FIGS. 6 and 7.

Figure 6:
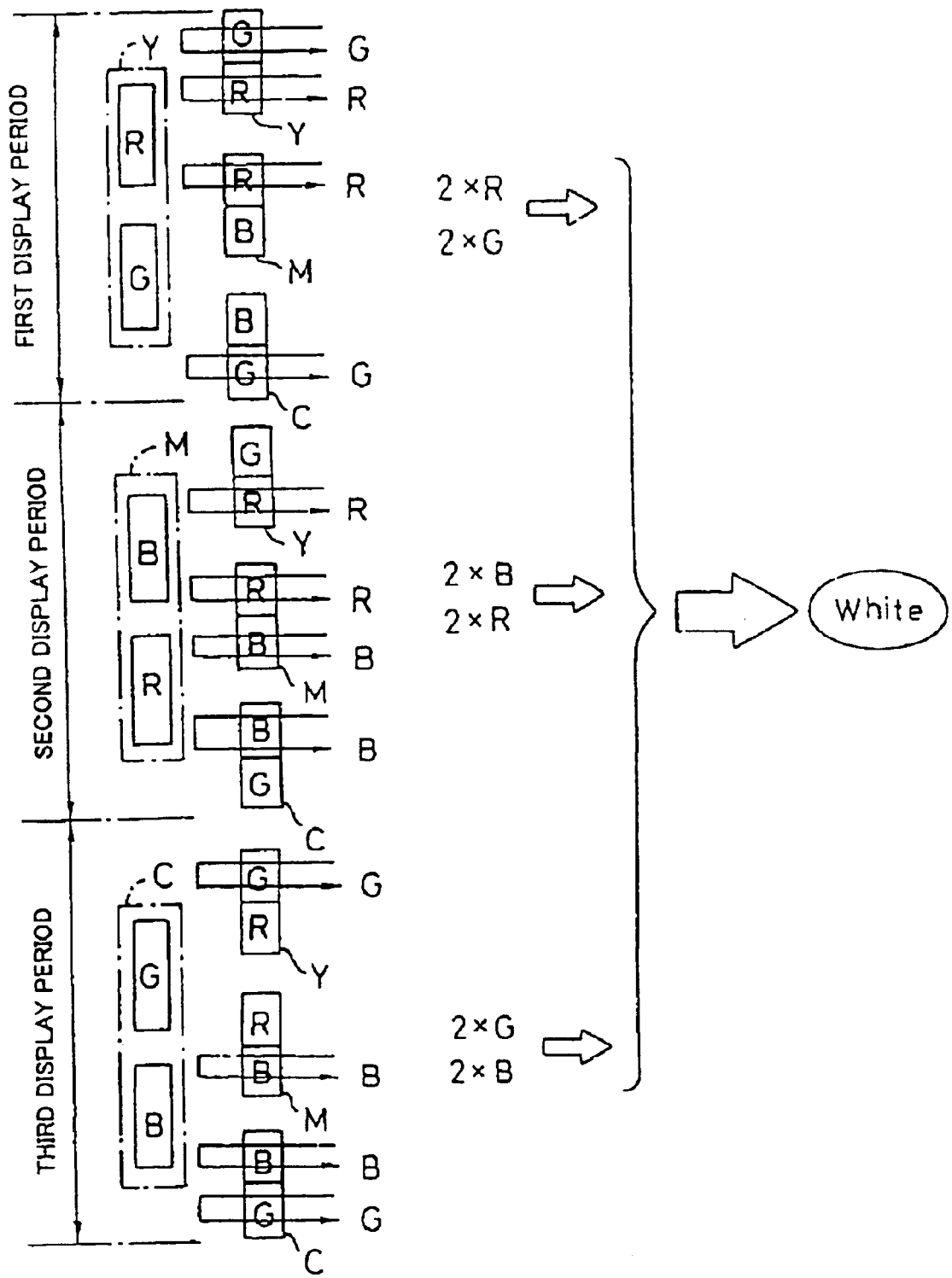
FIG. 6 is a schematic diagram illustrating, in the case of white/black display, the reflection regions of the reflection sheet in a combination of picture elements.

FIG. 6 illustrates a case where display of the white color is performed, the case being that the reflection regions 18Y, 18M, and 18C and the light transmitted states that prevail as a result of controlling the respective light transmittances of the picture elements 13Y, 13M, and 13C in the liquid crystal cell are illustrated in the sequential order of the first to the third display period. It s to be noted that in the first to the third display period the reflection regions 18Y, 18M, and 18C are located at the back of the liquid crystal cell 12 in this order.

In the first display period the reflection region 18Y is located at the rear surface of the liquid crystal cell 12. During this period, the three picture elements 13Y, 13M, and 13C are all controlled to their maximum transparence. The transmission type picture element transmits its color light and the reflection type picture element reflects its color light.

Accordingly, of the three color components, regarding the picture element 13Y the external lights corresponding to the G and R are transmitted and are reflected by the reflection region, then pass through the picture element to go out of it. Similarly, regarding the picture element 13M the R color light is transmitted, are reflected by the reflection region 18Y, again pass through the picture element 13M to go out of it. Regarding the picture element 13C the G color light is transmitted, and then is reflected by the reflection region 18C to go out f the picture element 13C.

In the next second display period as well, all the picture elements 13Y, 13M, and 13C are controlled each to a maximum transmittance. At this time, the reflection region 18M is moved to at the rear surface of the liquid crystal cell. As a result, the R color light is emitted from the picture element 13Y; the R and B color lights are emitted from the picture element 13M; and the B color light is emitted from the picture element 13C.

In the third display period as well, the picture elements 13Y, 13M, and 13C are controlled each to a maximum transmittance. At this time, the reflection region 18C is moved to at the rear surface of the liquid crystal cell 12. As a result, the G color light is emitted from the picture element 13Y; the B color light is emitted from the picture element 13M; and the B and G color lights are emitted from the picture element 13C.

As stated before, since the colors are mixed using micro time differences by the afterimage phenomenon of the viewer's retina, the three R, G, and B color lights during the three-time display periods are mixed together. Resultantly, the viewer comes to recognize the resulting color as a white color.

In this case, the picture element 13Y during the first display period, the picture element 13M during the second display period, and the picture element 13C during the third display period each transmit two of the three RGB colors and, in this case, the transmittance becomes $2/3$. And the other picture elements during each of the other display periods have a transmittance of $1/3$. Further, since the irrespective numerical apertures each are $1/3$, a reflectance of $4/9$ in total is obtained.

Since the conventional reflectance is $3/9$, that reflectance of $4/9$ results in that in the case of the present invention's white display the lightness increases 33% compared to the conventional case.

Figure 7:
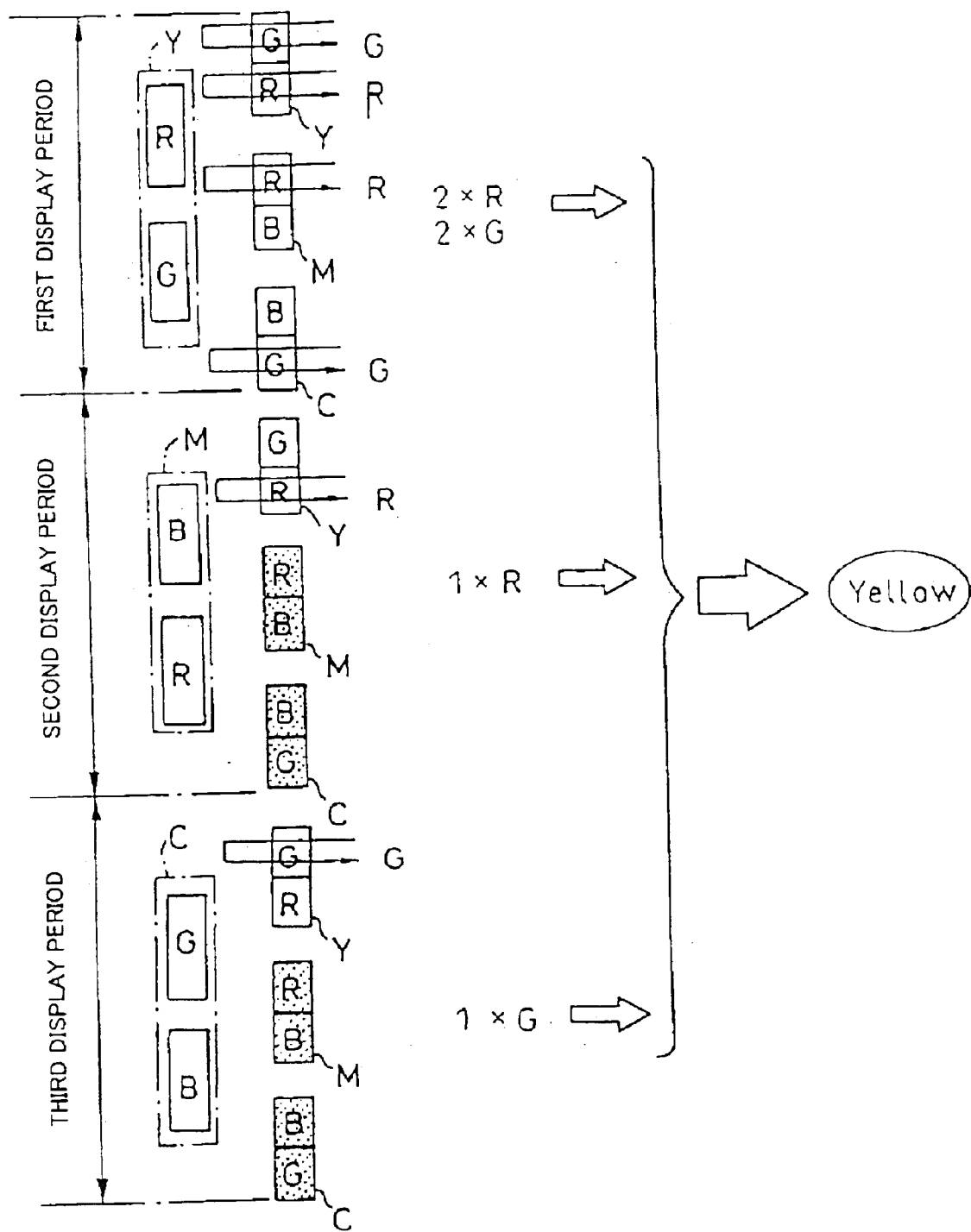
FIG. 7 is a schematic diagram in the case of yellow display.

Next, a case where display of the yellow color in FIG. 7 is performed will be explained.

In the case of yellow, during the first display period all the transmittances of the three picture elements 13Y, 13M, and 13C are made maximum and, with regard to the second and third display periods, in each of them, only the picture element 13Y is made to have a maximum transmittance and each of the remaining picture elements 13M and 13C is substantially made kept in a light-shaded state.

By this, in the first display period, the G and R color lights are emitted from the picture element 13Y; the R color light is emitted from the picture element 13M; and the G color light is emitted from the picture element 13C. And, in the second display period, the R color light is emitted from the picture element 13Y; and, in the third display period, the G color light is emitted from the picture element 13Y. As a result of this, as a whole, the viewer recognizes the displayed color as a yellow color by the additive color process of G and R.

Figure 8:
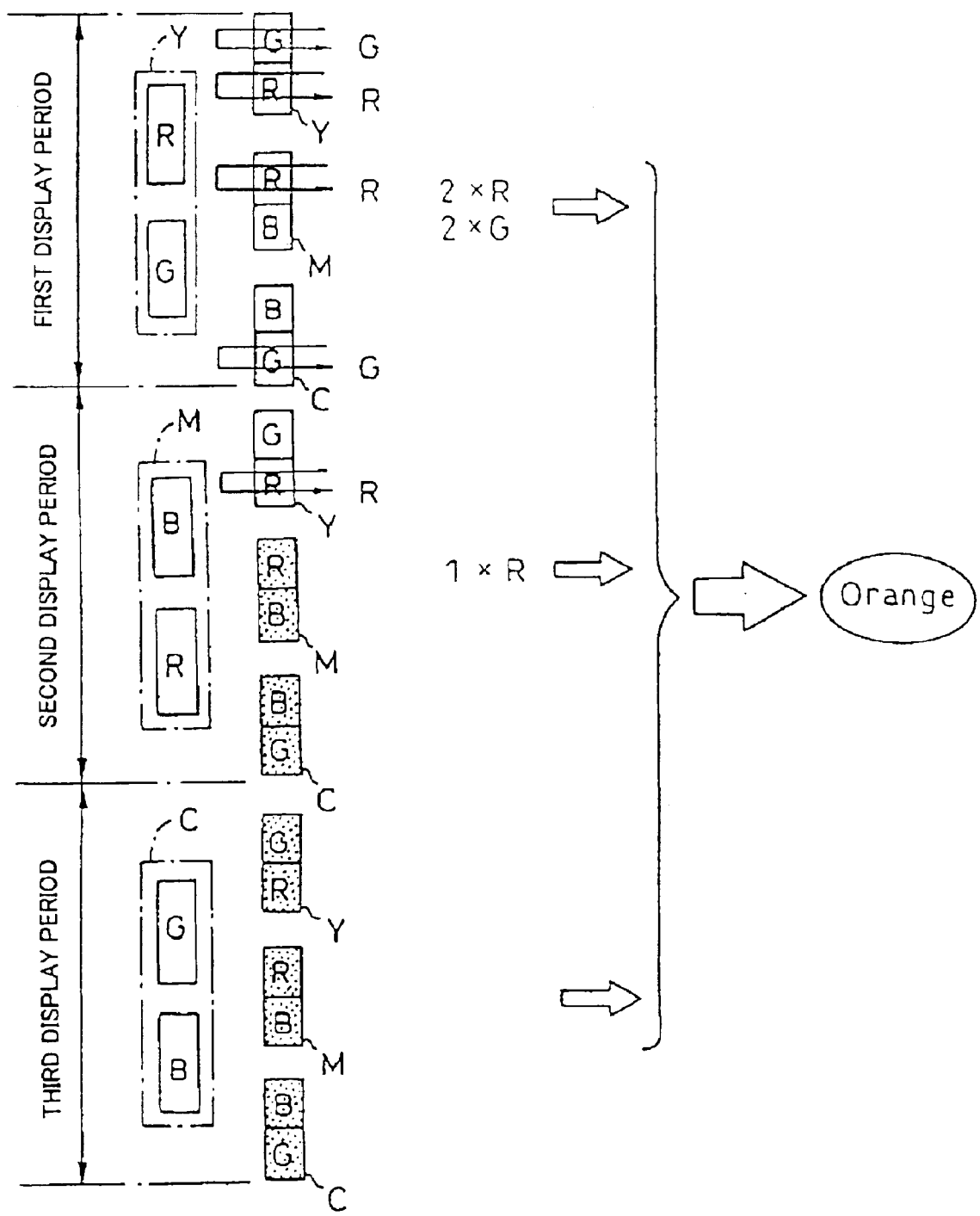
FIG. 8 is a schematic diagram in the case of orange display.
Figure 9:
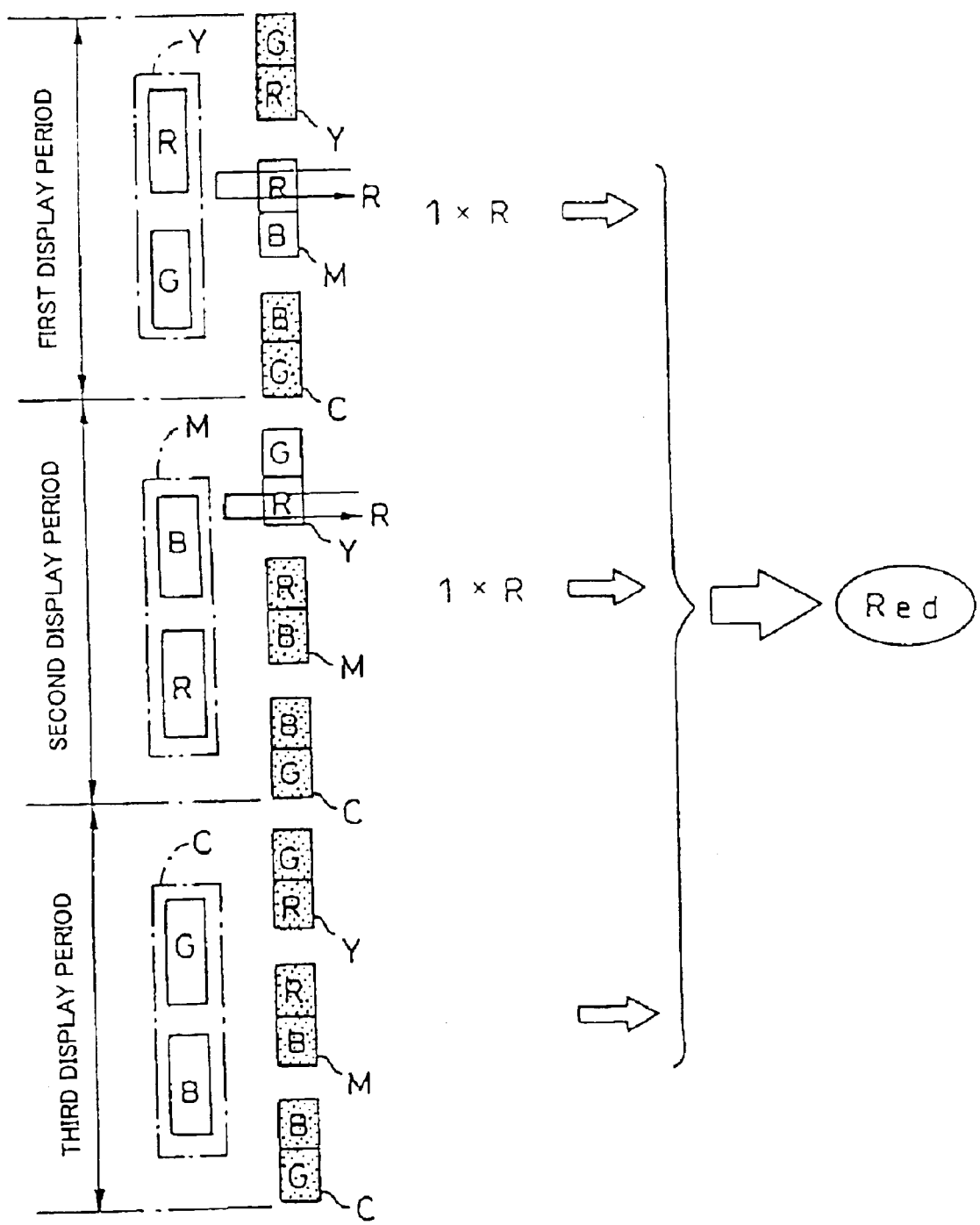
FIG. 9 is a schematic diagram in the case of red display.
Figure 10:
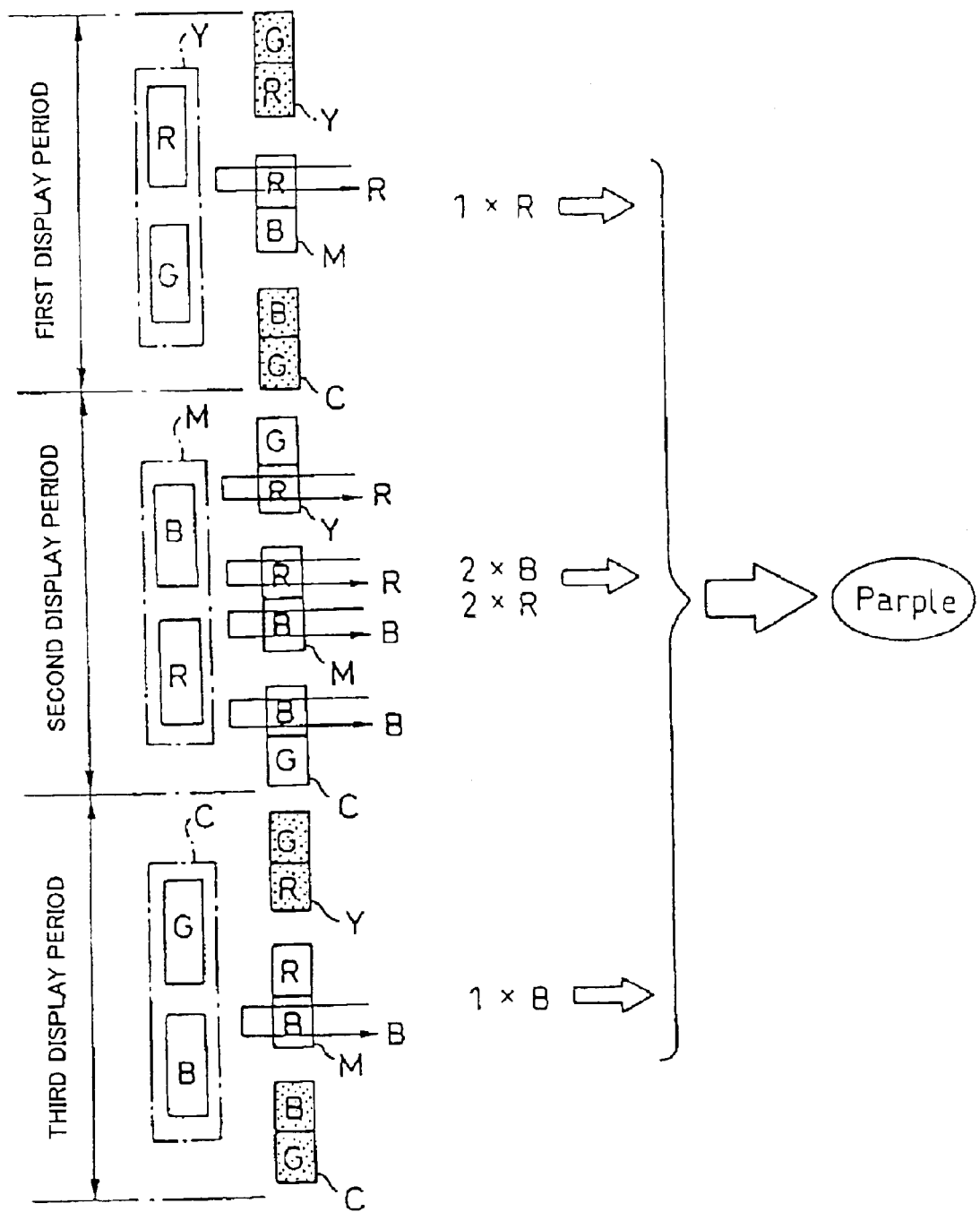
FIG. 10 is a schematic diagram in the case of purple display.

While FIG. 8 refers to an orange color; FIG. 9 refers to a red color; FIG. 10 refers to a purple color; and FIG. 11 refers to a greenish blue color, respectively, for displays thereof, the detailed explanations thereof are omitted.

The reflection type color liquid crystal display device 10 according to this example of the embodiment enables increasing the reflectance by constructing it in the above-described way. Especially, in the case of the white color display, since able to highly increase the reflectance, for example when displaying letters with a black color, the contrast can be enhanced.

Further, in the reflection type color liquid crystal display device 10 according to this first embodiment, the back-light light source for forming a monochromatic light, etc. is unneeded and therefore the amount of power consumption is less. Therefore, the device 10 is suitably used in a battery-driven portable electronic appliance, etc.

(Second Embodiment: Reflection Type Color Liquid Crystal Display Device)

Figure 12:
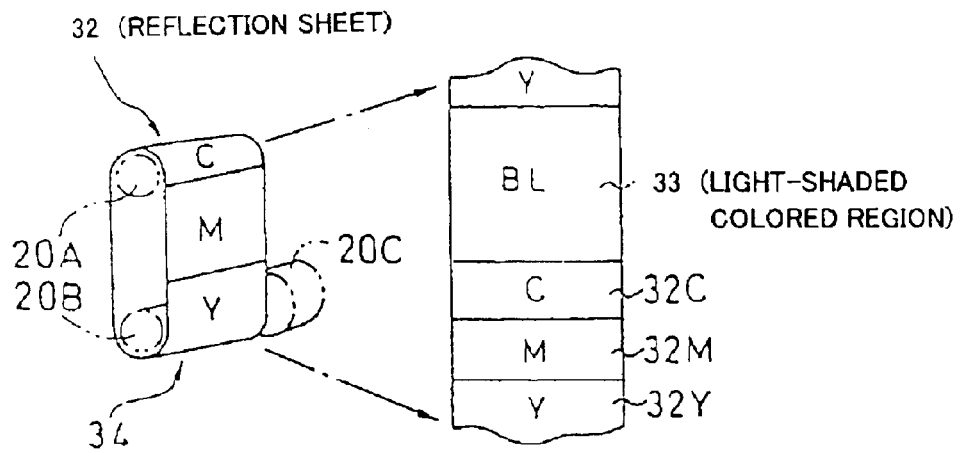
FIG. 12 is a perspective view, including a developed view of the reflection sheet, of the reflection type color liquid crystal display device according to a second embodiment of the present invention.

Next, the reflection type color liquid crystal display device according to a second embodiment of the present invention illustrated in FIG. 12 will be explained.

This reflection type color liquid crystal display device (the whole of that is not illustrated) is constructed of a liquid crystal cell 12 (not illustrated) similar to that of the reflection type color liquid crystal display device 10 illustrated in FIG. 1 and a reflection device 34 including a reflection sheet 32 that has reflection regions different from those previously stated.

The reflection sheet 32 has provided thereon light-shaded colored regions 33 in addition to reflection regions 32Y, 32M, and 32C of three colors Y, M, and C similar to those of the reflection regions 18Y, 18M, and 18C.

This light-shaded colored region 33 is colored, for example, black and the length in the movement direction of the reflection sheet 32 is made approximately 50 to 100% of the length of the reflection regions 32Y, 32M, and 32Cc.

On the other hand, in the liquid crystal cell 12, regarding the period corresponding to the light-shaded colored region 33, a black display is performed as the blanking period under the control of the control device 16.

Figure 11:
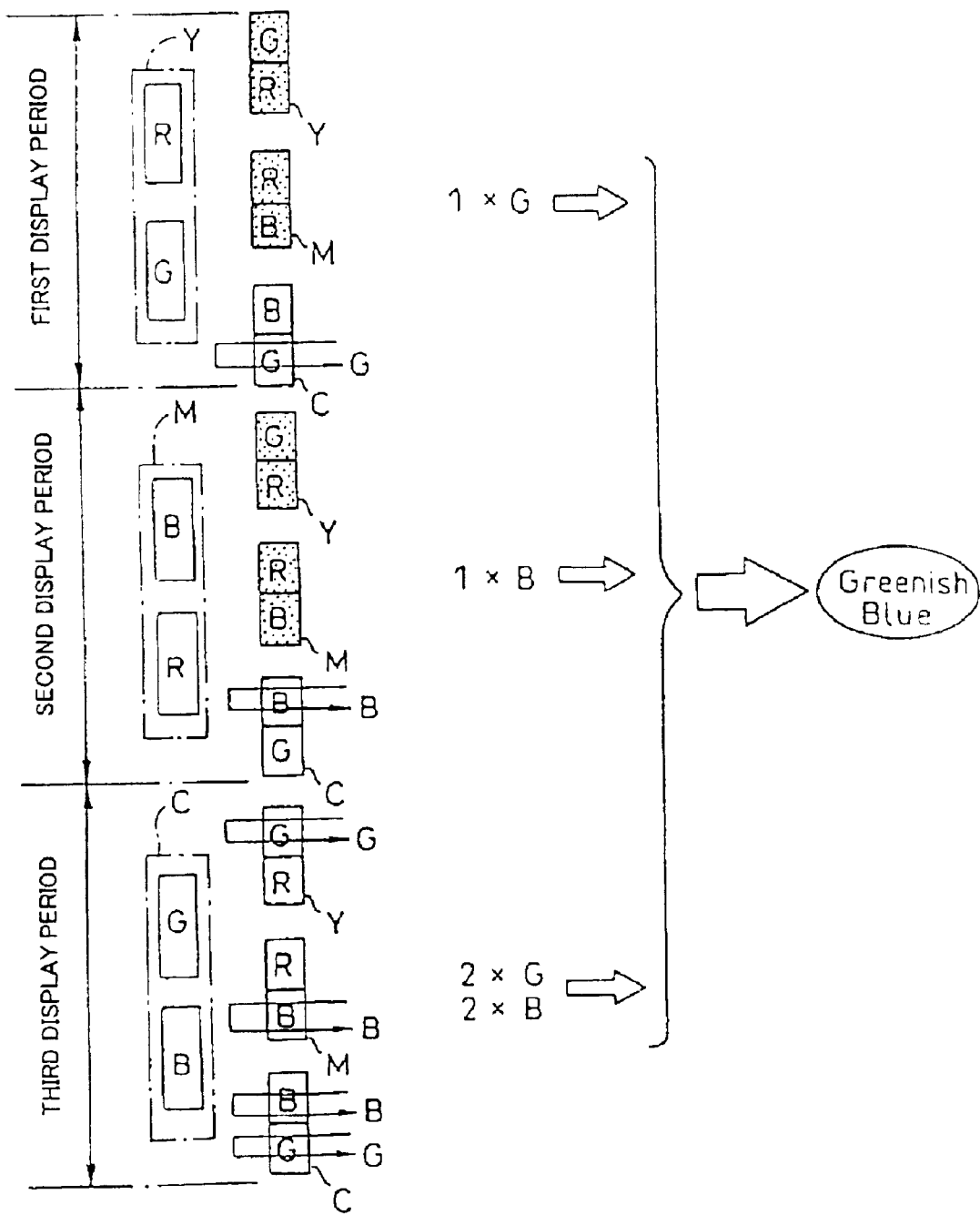
FIG. 11 is a schematic diagram in the case of greenish blue display.
Figure 13:
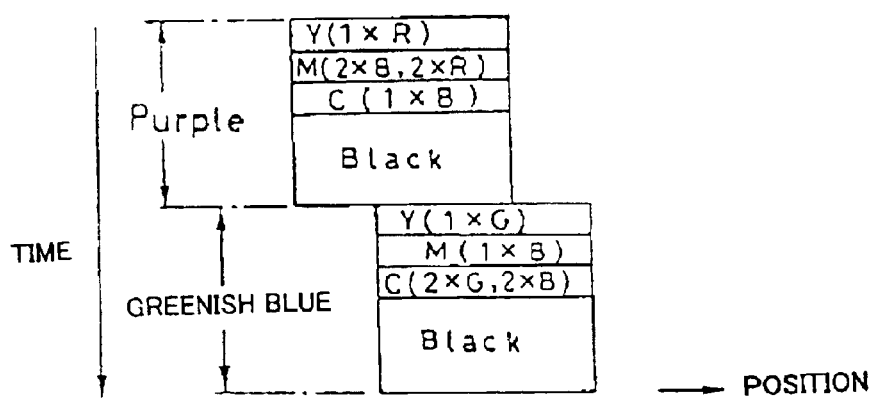
FIG. 13 is a schematic diagram illustrating the state of displayed colors in the reflection type color liquid crystal display device by the relationship between the horizontal-directional position and the time-axial direction of the screen.

Accordingly, in the reflection sheet 32 of the reflection type color liquid crystal display device, by the fields being sequentially rotated and moved in the sequential order of the reflection regions 32Y, 32M, and 32C, and light-shaded colored region 33, as typically illustrated in FIG. 13, in a case where, in the display of a moving picture that in this figure for example moves rightward, a purple display such as that in FIG. 10 is changed to a greenish blue display such as that in FIG. 11, a block display necessarily follows the display period.

Figure 14:
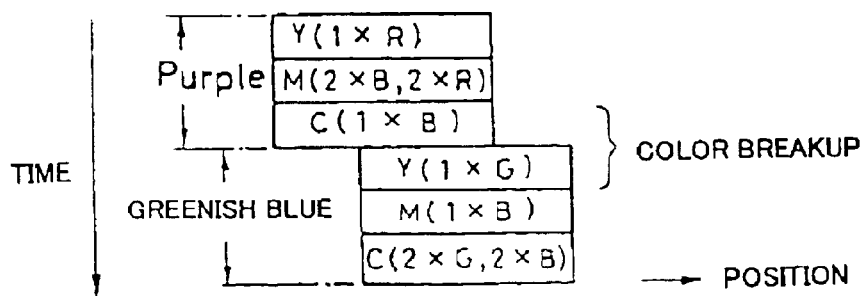
FIG. 14 is a schematic diagram, similar to that of FIG. 10, in the case where no light shading colored regions are provided on the reflection sheet.

By displaying the black color as above, the so-called "color breakup" can be prevented. Namely, in a case where no light-shaded colored regions are provided and no blanking period for display of a black color is provided on the side of the liquid crystal cell 12, when a similar moving picture display to that stated above is performed, as illustrated in FIG. 14, the B color in the third display period of purple and the G color in the first display period of the next greenish blue are inconveniently mixed together by the afterimage view phenomenon in the viewer's retina. Resultantly, it may happen that the so-called color breakup phenomenon will occur. However, in the reflection type color liquid crystal display device according to this example of the embodiment, since black display by the light-shaded colored region 33 occurs after the display of the third display period, there is no possibility of the color breakup occurring.

Incidentally, the ratio of the light-shaded colored region 33 to the length in the movement direction of the reflection regions 32Y, 32M, and 32C, preferably, is from ½ to 1. The reason for this is that when the length of the shaded colored region 33 is greater than ½ of the whole of the reflection sheet 32 the utilizing efficiency of the light source unpreferably decreases to the half or less while, on the other hand, when that length is smaller than ¼ of the whole of it there is the possibility of the above-described color breakup inconveniently occurring.

(Third Embodiment: Reflection Type Color Liquid Crystal Display Device)

Figure 15:
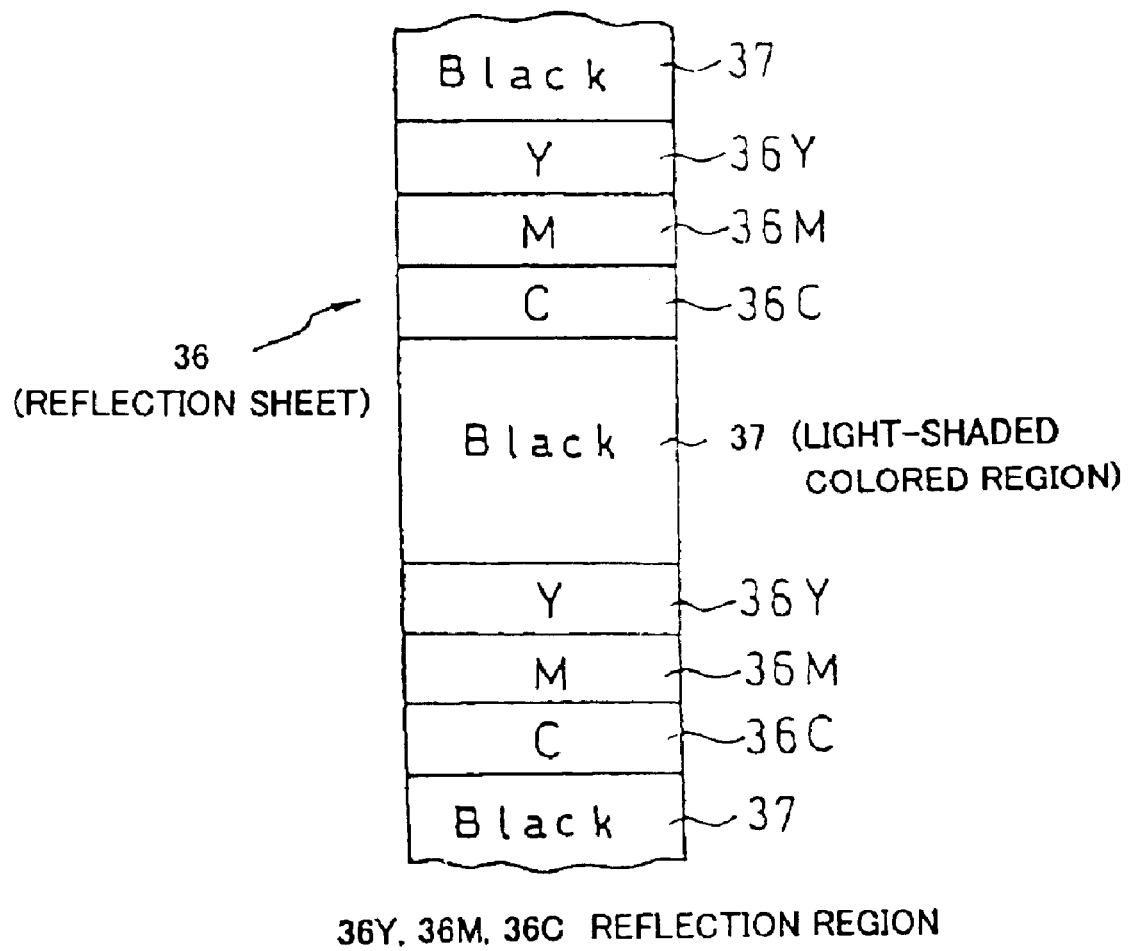
FIG. 15 is a developed view illustrating the reflection regions of the reflection sheet according to a third embodiment of the present invention.

In the above-described second embodiment, the reflection region for forming the reflected color light in the reflection sheet 18, 32 is only one with respect to each of the Y, M, and C. However, the present invention is not limited thereto. As illustrated in FIG. 15, the reflection regions 36Y, 36M, and 36C for Y, M, and C and/or these regions and shaded colored region 37 may be set two set pieces or more in number with respect to one reflection sheet 36.

In this case, the speed of the reflection sheet 36 can be made low compared to the reflection type color liquid crystal display device 10 proportionally to the number of the set pieces.

Further, in the above-described example of the embodiment, although the reflection sheet 18, 32, or 36 is continuously driven by the motor 20C, the present invention is not limited thereto. For example, as in the case of a cinema film, the reflection sheet may be fed on a per-frame basis in units of respective-colors and shaded colored region. In this case, for the motor 20C, a pulse motor preferably is used.

If, in this way, the reflection regions and/or shaded colored region in the reflection sheet is intermittently driven and rotated, since the holding time length for that region can be obtained, the visual recognizability of the screen can be highly enhanced.

EXAMPLE

Hereinafter, Examples of the present invention will be explained in detail.

First Example

First, by using a PET film having a thickness of 70 $\mu$m as the base member film and forming on it an aluminum layer of 60 nm, as the reflection layer, by the vacuum deposition method, a sheet was obtained. On this sheet, a photosensitive material that exhibits adhesion property by exposure of it to light was coated to form a photosensitive layer (the thickness: 1.5 $\mu$M).

Next, with respect to the photosensitive layer, ultraviolet rays were exposed via a photo-mask for use for the light-shading part. As the light source for exposure, an ultrahigh mercury lamp was used.

By doing so, there was formed a reflection sheet having reflection regions, the colors of that were three Y, M, and C colors. The width of the reflection sheet was made to be 40 mm and the lengths of the colored reflection regions were each were made to be 27 mm.

Next, as the driving device, there were used a motor and two juxtaposed small-sized cylinders each consisting of a rotary supporter member attached to the motor, the two cylinders having wound therearound the endless band-like reflection sheet so that this reflection sheet may be rotatable.

As the liquid crystal display panel, a TFT-LCD was adopted. The resolving power for display is 640×480 supported by the VGA. As the oriented film material, SE7210 (manufactured by Nissan Chemical Industries, Ltd.) was selected and was coated onto the TFT substrate and its opposing substrate, with respect to that parallel rubbing processing was executed. Optically compensated films with a gap of 6 $\mu$m therebetween were disposed on both surfaces of the cell. The size of the panel was made 30 mm×40 mm. The LCD is in OCB-mode.

As the liquid crystal, LIXON TD-6004XX manufactured by CHISSO CORPORATION was adopted and then the display property thereof was measured. The rotation speed of each of the two cylinders was synchronized with the response time of the liquid crystal by the control device.

As a result of this, an excellent color display could be obtained. Especially, the white display could be increased 33% in brightness compared to the conventional case. In addition, when it was used as the background for black letters, the contrast could greatly be increased.

Second Example

Although the construction in this second Example is the same as that of the first Example, the reflection sheet had been provided therein, subsequently to the Y, M, and C reflection regions, a light-shaded colored region the length of that is the same as that of one of those reflection regions.

As in the case of the first Example, the rotation speed of the cylinder was made to coincide with the response time of the liquid crystal. In addition, on the liquid crystal side, a black display period was provided correspondingly to that light-shaded colored region. By constructing like this, the display property was measured, and as a result in the case of a moving picture the so-called "color breakup" could be observed.

Third Example

The reflection sheet in this third Example was the same as in the second Example and the length of the entire light-shaded colored region was made the same as that of the three-color reflection regions as a whole, namely was made ½ with respect to the entire length of the reflection sheet. As a result, an excellent color display screen could be obtained without the color breakup occurring.

Further, in any one of the first to the third Example, the flickering of the light source did not occur, and, therefore, the changes in the light intensity at the time of a rising response and falling response, such as those in a case where using a short-afterglow light source such as an LED, did not occur, and a display that is gentle to the human eyes and that has a high visual recognition property could be obtained.

(Fourth Embodiment: Semi-transmission/Semi-reflection Color Liquid Crystal Display Device)

Hereinafter, a semi-transmission/semi-reflection color liquid crystal display device according to a fourth embodiment of the present invention will be explained in detail with reference to the drawings.

Figure 16:
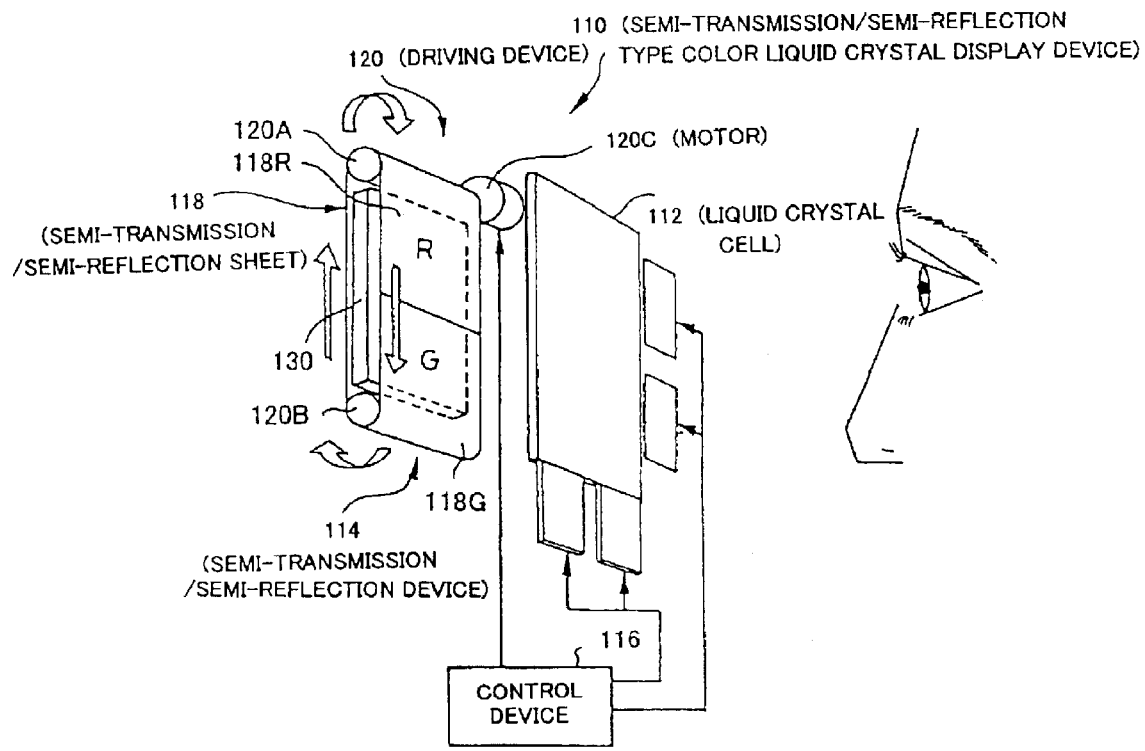
FIG. 16 is a schematic exploded perspective view illustrating a semi-transmission/semi-reflection type color liquid crystal display device according to a fourth embodiment of the present invention.

As illustrated in FIG. 16, the semi-transmission/semi-reflection color liquid crystal display device 110 according to this example of this fourth embodiment is constructed in the way of including a field sequential system of liquid crystal cell 112 in which the light transmittances are sequentially controlled correspondingly to the 1-frame R (red), G (green), and B (blue) colors of the screen to be displayed, which constitutes the same pixel, and a semi-transmission/semi-reflection device 114 that is disposed at the rear surface of the liquid crystal cell 112 so that the external light passing through this liquid crystal cell 112 may go into.

The liquid crystal cell 112 is placed under the control of the control device 116 and, in this condition, performs color display through the use of the field sequential (picture element sequential display) method, namely through the use of the method wherein the colors are mixed using micro time differences.

Specifically, it is arranged that the R, G, and B colors be divided into three fields (images) and, by changing over these fields with a high speed in turn, one piece of color image be synthesized.

Accordingly, momentarily in terms of time, a monochromatic image is only displayed, but, if the repeated speed of the fields is fast enough to prevent the display from being recognized as flickering, the colors are mixed by the after image view phenomenon of the retina and are thereby recognized as a color image.

The monochromatic light of each of the R, G, and B colors entering the liquid crystal cell 112 from the rear surface thereof is formed by the reflection device 114, namely, in synchronism with the changeover timing, corresponding to and representing that of an optical shutter, of the liquid crystal cell 112, the respective color lights are sequentially transmitted, and are reflected/formed.

Figure 17:
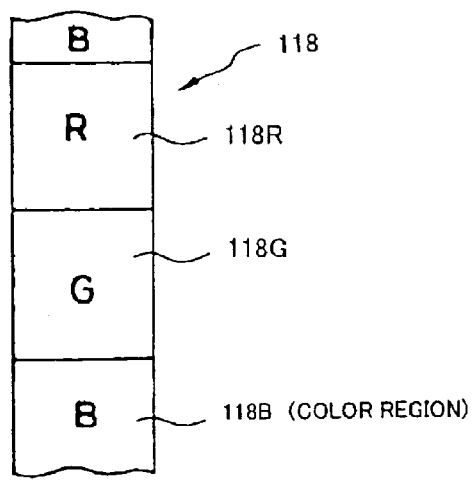
FIG. 17 is a developed view illustrating a semi-transmission/semi-reflection film in the semi-transmission/semi-reflection type color liquid crystal display device.

The semi-transmission/semi-reflection device 114 is constructed in the way of including an endless band-like semi-transmission/semi-reflection film 118 (see FIG. 17) the color of that is divided into three color regions 118R, 118G, and 118B so as to transmit the three colors of R, G, and B to thereby form their corresponding reflected lights, a driving device 120 constructed in the way of including a pair of rolls 120A and 120B for driving this semi-transmission/semi-reflection film 118 by its being wound over and around each of them and a motor 120C for driving at least one roll, and a light source 130 that is disposed within the paired rolls 120A, 120B and semi-transmission/semi-reflection film 118 and that radiates its emitted light toward the rear surface of the liquid crystal cell 112 via the semi-transmission/semi-reflection film 118.

Figure 18:
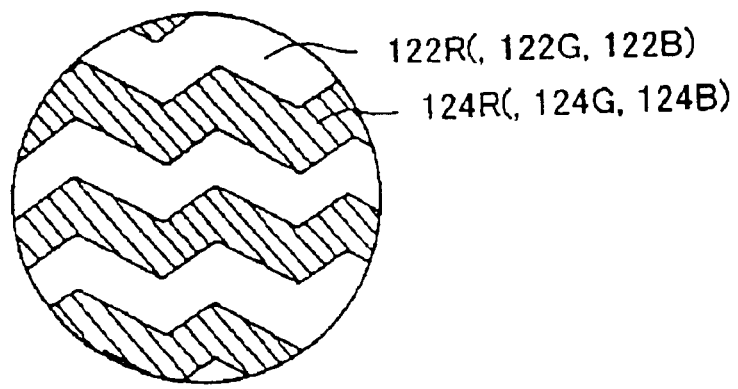
FIG. 18 is an enlarged view illustrating a developed part of the semi-transmission/semi-reflection film in the semi-transmission/semi-reflection type color liquid crystal display device.

The color region 118R consists of a transmission region 122R and a reflection region 124R, which are arrayed so that they may sequentially alternately appear in the movement direction of the semi-transmission/semi-reflection film 118. The configuration of each of the transmission region 122R and reflection region 124R is a zigzag configuration the width of that is prescribed and that extends in a direction perpendicular to the sequential-movement direction of the film 118 (see FIG. 18). Also, the angle of the zigzag, namely the angle of inclination of the transmission region 122R and reflection region 124R is set to be 10° to 80° with respect to that movement direction or the direction perpendicular thereto.

Similarly, each of the color regions 118G and 118B also consists of a corresponding transmission region 122G or 122B and a corresponding reflection region 124G or 124B. And these regions are arrayed so that they may alternately appear in the sequential movement direction of the film 118.

The motor 120C is controlled by the control device 116 so that, within the changeover speed range of the fields in the liquid crystal cell 112, the color regions 118R, 118G, and 118B may be located at the rear surface of the liquid crystal cell 112 in turn. The changeover of the fields in the liquid crystal cell 112 is controlled in synchronism with the changeover speed of the color regions 118R, 118G, and 118B.

Figure 19:
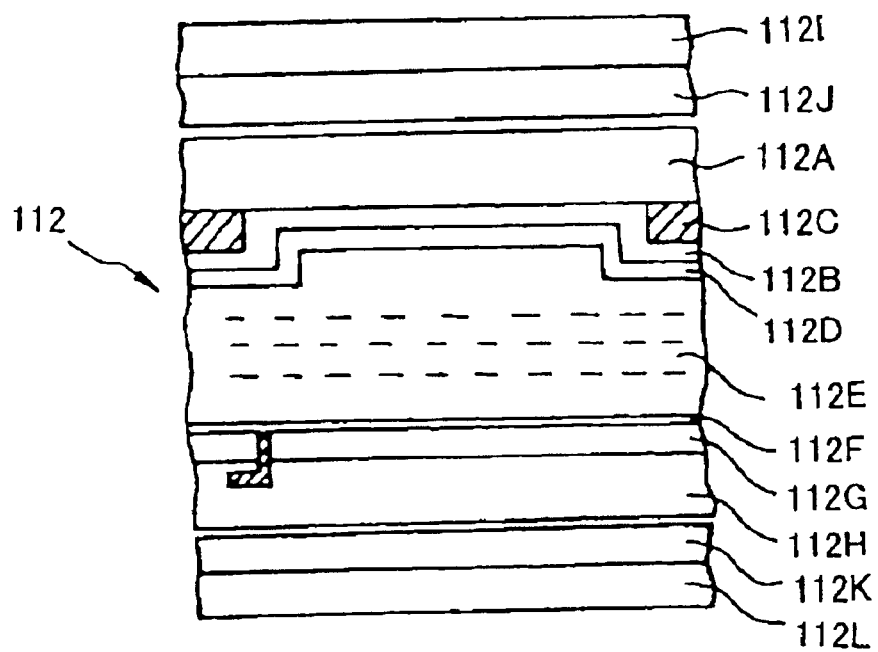
FIG. 19 is an enlarged sectional view illustrating one picture element of the liquid crystal in the semi-transmission/semi-reflection type color liquid crystal display device.

As has its part illustrated in FIG. 19 on an enlarged scale, the liquid crystal cell 112 is constructed in the way of including, when viewed from the viewer's side, a display side transparent substrate 112A, transparent common electrode 112B, black matrix 112C formed between the outer-peripheral parts of respective picture elements in this transparent common electrode and the display side transparent substrate 112A, oriented film 112D, liquid crystal layer 112E, an opposite-side oriented film 112F that clamps this liquid crystal layer 112E together with that oriented film 112D, picture-element electrode 112G supporting the oriented film 112F, TFT array transparent substrate 112H supporting the transparent picture-element electrode 112G, polarizing plates 112I, 112L, and optically compensated films 112J, 112K.

Incidentally, this liquid crystal cell 112 is not limited to the construction illustrated in FIG. 19 and maybe constructed by the element prepared by other known techniques. However this liquid crystal cell is different from the conventional color liquid crystal display device in the respect of having no per-color color filters as well as in that each picture element displays multiple colors.

Figure 20:
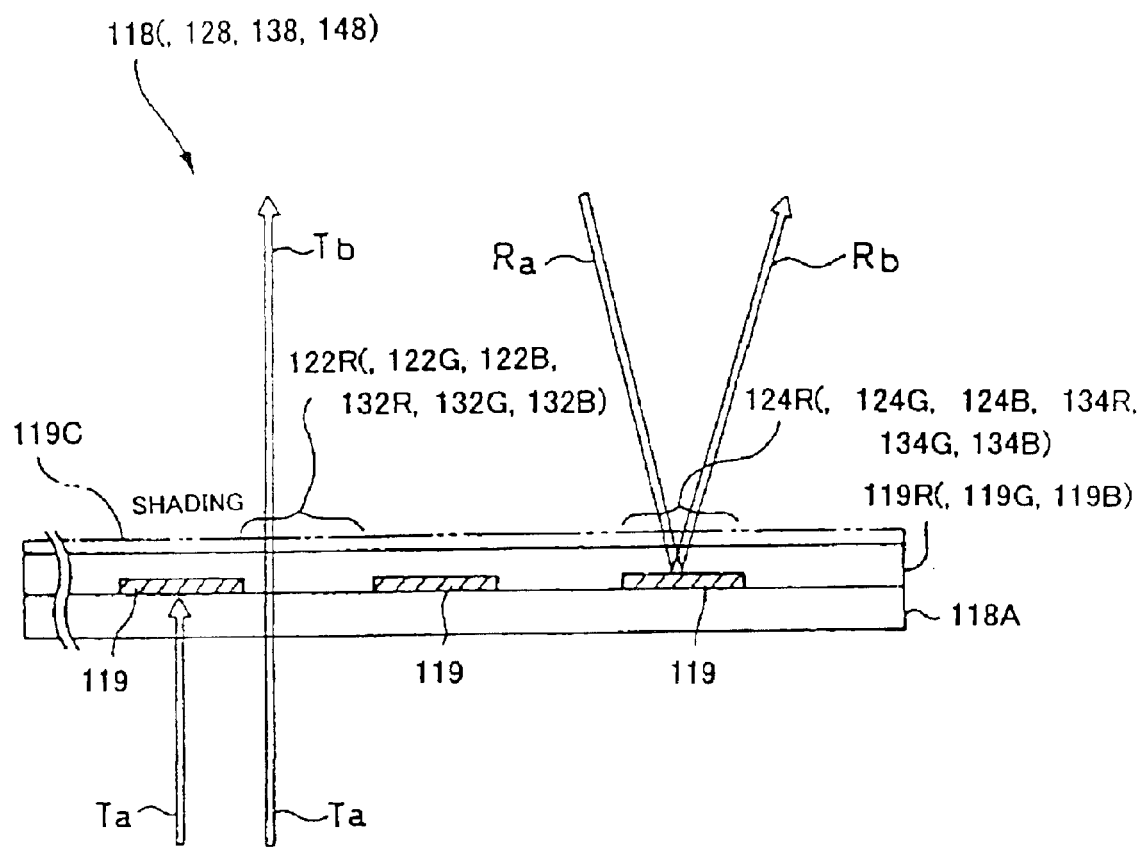
FIG. 20 is an enlarged sectional view illustrating part of the semi-transmission/semi-reflection film in the semi-transmission/semi-reflection type color liquid crystal display device.

As illustrated in FIG. 20, the cross-sectional structure of the semi-transmission/semi-reflection film 118 in the semi-transmission/semi-reflection device 114 has a base film 118A such as a resin film, on which, when viewed on the plane, zigzag configured reflection layers 119 are intermittently formed at prescribed intervals. And on these reflection layers there are formed colored layers 119R, 119G, and 119B. The colored layers 119R, 119G, and 119B are filled in between the reflection layers and are formed so that they may make the film 118 uniform in thickness while including the reflection layers 119. The regions where the reflection layers 119 are formed correspond to the reflection regions 124R, 124G, and 124B while the regions where no such reflection layers 119 are formed correspond to the transmission regions 122R, 122G, and 122B.

As the base member film 118A there is used a transparent plastic film such as polyethylene terephthalate (PET) film, polyester film, polycarbonate film, polyacrylic film, or polyolefin. The thickness of this base member film 118A preferably is from 10 $\mu$m to 5 mm although not particularly limited.

When the thickness of the base member film 118A is less than 10 $\mu$m, during continuous rotation (movement) the resistance to scratch becomes inferior. When that thickness is more than 5 mm, the rigidity becomes excessively high, with the result that the rotation is not smoothly performed; the light absorption comes into excess; and the light transmittance becomes low.

The reflection layer 119 formed on the base member film 118A is formed, for example, by treating a high-reflectance metal such as aluminum or silver by the physical vapor deposition (Physical Vapor Deposition: PVD) method. As the PVD method, it is suitably selected from ordinary means for forming a metal thin film, such as vacuum deposition method, sputtering method, or ion plating method. Also, the reflection layer 119 may be formed by being laminated into a plurality of layers. Here, the thickness of the reflection layer 119 enables a sufficiently high reflectance if it is to an extent of 50 nm to 100 nm or so. In order to pattern the reflection layer 119 formed on the entire surface of the base member film 118A so that it may have the zigzag configured reflection regions 124R, 124G, and 124B, photo-etching (photo-etching) technique or the like is used.

It is arranged that, as illustrated in FIG. 20, the colored layers 119R, 119G, and 119B be formed on the base member film 118A having had patterned thereon the reflection layer 119 so as to transmit and reflect the prescribed color lights. The concrete coloring method is as in the case of the conventional coloring method for filters, namely means such as the staining method, dispersion method, etc. is used therefor.

Also, in a case where having formed the light reflection layer by the PVD such as deposition technique, in order to prevent the deterioration of the reflection layer, over the reflection layer 119 and colored layers 119R, 119G, and 119B there is preferably provided a protection layer 119C consisting of a coated film such as an acrylic resin, epoxy resin, polyester resin, urethane resin, alkyd resin, etc. This coating preferably is performed by roll-coating, photogravure coating, or spray coating. Further, a thin film made of inorganic material such as silicon oxide can also be used as the protection layer.

Since the response time length needs to be made 2 to 3 ms or less, and since a high-speed switching transistor such as polysilicon preferably is used for the TFT, a high-speed response liquid crystal such as an OCB (Optically Compensated Birefringence) liquid crystal, or ferroelectric liquid crystal is preferable as the kind of the liquid crystal used for the liquid crystal layer 112E in the liquid crystal cell 112.

In the case of the field sequential display, in order to prevent the occurrence of flickering in the screen, the field time period needs to be made 17 ms (1/60 sec) or less. Therefore, the display time period for one of the respective reflection regions 118R, 118G, and 18B needs to be set 6 ms or less.

Incidentally, the movement speed of the color regions 18R, 18G, and 18B is proportionate to the size of the entire viewing screen in the liquid crystal cell 112 and is in inverse proportion to the length in the movement direction of each of the respective color regions 18R, 18G, and 18B.

Also, the movement direction of the color regions 118R, 118G, and 118B of the semi-transmission/semi-reflection film 118 may be any one of the up-and-down direction, left-and-right direction, and oblique direction with respect to the liquid crystal cell (the screen).

In the semi-transmission/semi-reflection type color liquid crystal display device 110 according to the fourth embodiment, the reflection sheet 118 is arranged so that the color regions 118R, 118G, and 118B therein in the semi-transmission/semi-reflection device 114 are rotated in a prescribed direction with a prescribed speed by the driving device 120. In synchronism with this, the liquid crystal cell 112 is controlled by the control device 116 so that the picture element therein may display any color of the corresponding color regions 118R, 118G, and 118B.

Accordingly, by, at the above-described intervals of 17 ms or less, the color regions 118R, 118G, and 118B being sequentially moved and, in synchronism with this, the R, G, and B displays in the liquid crystal cell 112 being sequentially controlled, the lights emitted from the back light 130 are transmitted by any corresponding ones of the transmission regions 122R, 122G, and 122B in the color regions 118R, 118G, and 118B to become colored lights, which are transmitted through the liquid crystal cell 112. Also, the external light that has entered the liquid crystal cell 112 from the surface thereof, after passing through the liquid crystal cell 112, are reflected by any of the reflection regions 124R, 124G, and 124B in the color regions 118R, 118G, and 118B to become a colored light, which passes through the liquid crystal cell 112 again to thereby sequentially perform color display.

In more detail, when, as illustrated in FIG. 20, the lights Ta emitted from the back light source 130 enter any of the transmission regions 122R, 122G, and 122B of the semi-transmission/semi-reflection film 118, they become colored lights when passing through the colored layers 119R, 119G, and 119B. Thereafter, in a state where the timing with which the colored lights pass through the liquid crystal cell 112 is synchronized with the driving device 120, the colored lights are controlled by the control device 116 and are emitted as the transmitted colored lights Tb to thereby perform the desired color displays.

On the other hand, simultaneously, when the external lights Ra that have entered from the surroundings enter any of the reflection regions 124R, 124G, and 124B of the film 118, they become colored lights when passing through the colored layers 119R, 119C, and 119B. Thereafter, as in the above-described case, the colored lights are emitted by the liquid crystal cell 112, driving device 120, and control device 116 as the reflected colored lights Rb and thereby perform the desired color displays.

In this way, irrespective of whether the ambient surroundings are dark or light, the transmitted colored light Tb and reflected colored light Rb can be emitted from the liquid crystal cell 112.

On the viewer's side, by the R, G, and B color lights in the same pixel being sequentially displayed during the field period of 1/60 sec or less, the colors are mixed together using micro time differences by the afterimage view phenomenon of the retina and are thereby recognized as a color image.

Especially, in the semi-transmission/semi-reflection color liquid crystal display device 110 according to this fourth embodiment, by using the back light source 130 for forming a monochromatic light, a clear and light viewing screen display can be realized with a small amount of power consumption, and, therefore, the device is suitably used in a battery-driven portable electronic equipment or the like.

The value of lightness of the image when letters are displayed with no background color being displayed is shown in Table 1, provided, however, that the numeric value is relative and it represents an absolute number that is obtained when the "background part" in the "conventional example" is set to be "1" which is a reference value.

TABLE 1

|  | letter part | background part | level of visibility (contrast) |
|---|---|---|---|
| A. Conventional example | 0.1 | 1.0 | 10 |
| B. Example of the embodiment | 0.1 | 1.4 | 14 |

By suitably utilizing the transmitted colored light resulting from the use of the back light source 130 or the reflected colored light resulting from the use of external light, as shown in Table 1, the lightness at the background part increases to a value 1.4 times as great as the value in the conventional example. Namely, even if the lightness at the letter part remains as it is as in the conventional case, the level of visibility is improved to 1.4 times higher and as a result the image becomes easier to view.

Incidentally, it is preferable that the ratio of the total area of the transmission regions 122R, 122G, and 122B of the semi-transmission/semi-reflection film 118 to the total area of the reflection regions 124R, 124G, and 124 has a value falling within a range of from 2:1 to 1:9. When the total area of the transmission regions 122R, 122G, and 122B becomes more than 2 times larger than that of the reflection regions 124R, 124G, and 124B, the utilization efficiency of the external light decreases with the result that a light image becomes unable to be displayed unless more highly excessively depending upon the light source 130. On the other hand, when that ratio becomes less than $\frac{1}{10}$, even if it is dark outdoors, since the light from the light source 130 is shaded, the power is not only more consumed by that extent but a faint or unclear, and dark, viewing screen can only be displayed.

Also, by making the size of the zigzag configured picture element minimum unit constructed by the transmission and reflection region of the semi-transmission/semi-reflection film 118, smaller than the size of the 1 picture element in the liquid crystal cell 112, it is arranged that, when moving this semi-transmission/semi-reflection film 118, the flickering phenomenon of darkness and lightness of the screen as viewed from the viewer's side be suppressed without increasing the precision with which to control the liquid crystal cell 112.

Further, if the size of the minimum unit of the configuration of the zigzag configured transmission and reflection region, whether that configuration is mosaic, or shaped like a honeycomb, etc., is smaller than the size of a 1 picture element in the liquid crystal cell 112, the same effect as that described above is obtained without increasing the precision of driving control for the semi-transmission/semi-reflection film 118.

(Fifth Embodiment: Semi-transmission/Semi-reflection Type Color Liquid Crystal Display Device)

Next, a semi-transmission/semi-reflection type color liquid crystal display device 140 according to a fifth embodiment of the present invention illustrated in FIG. 21 will be explained.

This semi-transmission/semi-reflection type color liquid crystal display device 140 (the whole of that is not illustrated) includes a liquid crystal cell 112 (not illustrated), control device 116 (not illustrated), driving device 120 (not illustrated), and back light source 130 similar to those in the semi-transmission/semi-reflection type color liquid crystal display device 110 illustrated in FIG. 16 and, in addition, a semi-transmission/semi-reflection device 134 that includes a semi-transmission/semi-reflection film 128 having a transmission/reflection region pattern different from the pattern of the semi-transmission/semi-reflection film 118.

The semi-transmission/semi-reflection film 128 has provided therein three-color colored regions 128R, 128G, and 128B of R, G, and B similar to those of the color regions 118R, 118G, and 118B.

Figure 21:
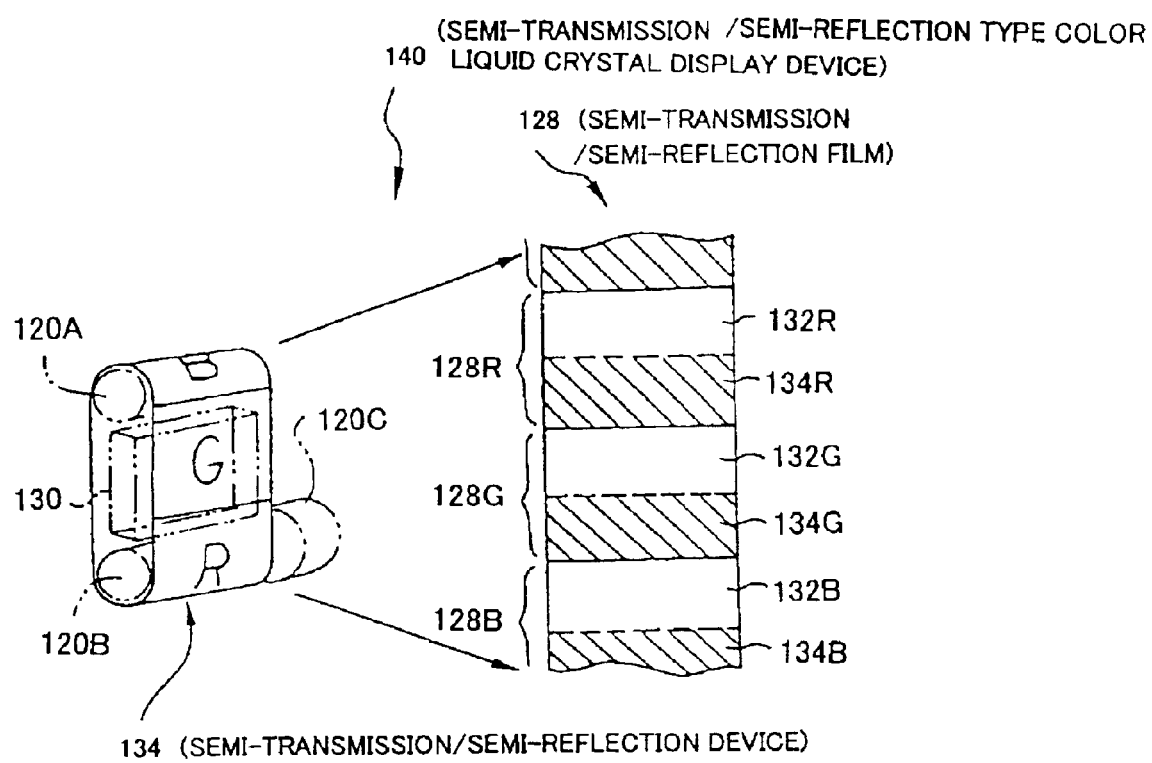
FIG. 21 is a perspective view, including a developed view of the semi-transmission/semi-reflection film, of the semi-transmission/semi-reflection type color liquid crystal display device according to a fifth embodiment of the present invention.

As illustrated in FIG. 21, the color region 128R consists of a transmission region 132R and a reflection region 134R, which are disposed as those which are prepared by dividing the color region 128R into beginning and ending half sides in the movement direction of the film 128.

Similarly, the color region 128G consists of a transmission region 132G and a reflection region 134G, and the color region 128B consists of a transmission region 132B and a reflection region 134B. These paired regions are disposed as the regions which are prepared by dividing the color regions 128G or 128B into beginning and ending half sides in the movement direction of the film 128.

The cross-sectional structure of the semi-transmission/semi-reflection film 128 in the semi-transmission/semi-reflection device 134 is typically the same as that of the semi-transmission/semi-reflection film 118 illustrated in FIG. 20. The respect in that the former differs from the latter is that, in the former cross-sectional structure, the plane configuration of the reflection layer 119 that is intermittently formed at prescribed intervals on the base member film 118A is not zigzag but rectangular and this reflection layer 119 is disposed as reflection regions 134R, 134G, and 134B respectively in the color regions 128R, 128G, and 128B, namely one reflection region per color region.

The motor 120C is controlled by the control device 116 so that, within a field changeover speed range of the liquid crystal cell 112, the color regions 128R, 128G, and 128B may be located just at the rear surface of the liquid crystal cell 112 in turn. The changeover of the field of the liquid crystal cell 112 is controlled in synchronism with the speed of the changeover of the color region 128R, 128G, or 128B.

It is arranged, through the drive of the motor 120C, that, in the semi-transmission/semi-reflection film 128, in units of a color region, the transmission region and the reflection region appear each once in the order of 132R→134R→132G→134G→132B→134B.

As a result of this, as in the case of the fourth embodiment, irrespective of whether the surroundings are dark or light, it is possible to emit the transmitted colored light and reflected colored light from the liquid crystal cell 112.

The field period for preventing the occurrence of flickering in the screen when performing field sequential display, the control requirements for the display periods of the respective color regions 128R, 128G, and 128B, etc. are also the same as in the fourth embodiment of the present invention.

Incidentally, the movement direction of the color regions 128R, 128G, and 128B in the semi-transmission/semi-reflection film 128 must be the direction in which the color lights of the respective color regions cross the liquid crystal cell (viewing screen) at right angles with respect thereto.

In the fifth embodiment of the present invention, the reflection region 134R, 134G, or 134B is in the shape of a simple piece of rectangle and one that region occupies only one space in each of the respective color regions 128R, 128G, or 128B. Therefore, in the process of patterning this reflection layer 119, also, the patterning is not required to have a precision that is as high as that with which to make it zigzag is, and, therefore, the film 128 can be manufactured at a low cost.

(Sixth Embodiment: Semi-transmission/Semi-reflection Type Color Liquid Crystal Display Device)

Further, the semi-transmission/semi-reflection type color liquid crystal display device 170 according to a sixth embodiment of the present invention will be explained.

This semi-transmission/semi-reflection type color liquid crystal display device 170 (that is wholly not illustrated) includes a liquid crystal cell 112 (not illustrated), control device 116 (not illustrated), driving device 120 (not illustrated), and back light source 130 similar to those in the semi-transmission/semi-reflection type color liquid crystal display device 110 illustrated in FIG. 16 and, in addition, a semi-transmission/semi-reflection device 154 that includes a semi-transmission/semi-reflection film 138 having a transmission/reflection region and color region arrayed in a different way from that in the case of the semi-transmission/semi-reflection film 128.

The semi-transmission/semi-reflection film 138 has provided in its transmission and reflection regions, respectively, three-color colored regions 132R, 132G, and 132B, and 134R, 134G, and 134B of R, G, and B similar to those of the color regions 128R, 128G, and 128B (refer to FIG. 22).

Also, the semi-transmission/semi-reflection film 138 is driven by the driving motor 120C relative to the liquid crystal cell 112 and it is arranged that in units of a transmission region and a reflection region, their respective color regions appear, respectively once, in the order of 132R→132G→132B→134R→134G→134B.

As illustrated in FIG. 22, in the dark surroundings, by lighting up the light source 130, the transmission regions 132R, 132G, and 132B are used as the color regions while the reflection regions 134R, 134G, and 134B function as the light-shaded colored regions. Conversely, in the light surroundings, by turning off the light source 130, the transmission regions 132R, 132G, and 132B function as the light-shaded colored regions while the reflection regions 134R, 134G, and 134B that are lightened by the external light are used as the respective color regions.

In this way, the transmitted colored light and the reflected colored light can be emitted from the liquid crystal cell 112 by being suitably selected correspondingly to the darkness or lightness of the surroundings.

Although the requirements of control that regard the field period, which prevent the occurrence of flickering in the screen of the field sequential display, remain unchanged, since, as stated previously, the transmission region and the reflection region work as the light-shaded colored regions so that they may complement each other, the display period for each of the regions 132R, 132G, 132B, 134R, 134G, and 134B needs to be set 3 ms or less.

Incidentally, that the movement direction of each color region 132R, 132G, or 132B, or 134R, 134G, or 134B must be the one in which the color light of it crosses the liquid crystal cell (the screen) at right angles thereto, namely be the up-and-down direction is the same as in the case of the fifth embodiment of the present invention.

On the other hand, in the liquid crystal cell 112, it is arranged, through the use of the control device 116, that the period corresponding to the light-shaded colored region performs a black display as the blanking period.

Figure 23:
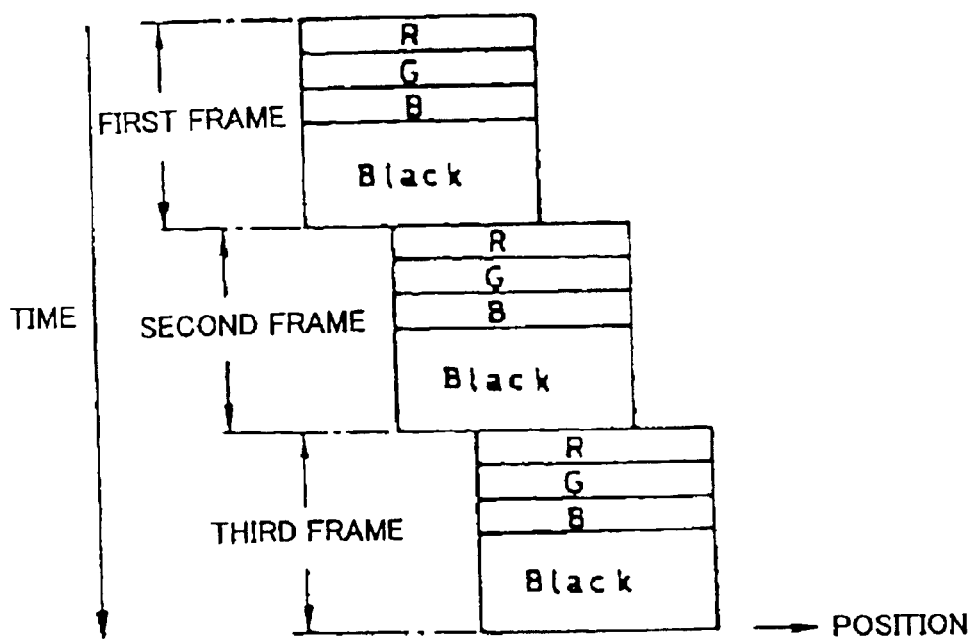
FIG. 23 is a schematic diagram illustrating the state of displayed colors in the semi-transmission/semi-reflection type color liquid crystal display device by the relationship between the horizontal-directional position and the time-axial direction of the screen.

Accordingly, the semi-transmission/semi-reflection film 138 in this semi-transmission/semi-reflection type color liquid crystal display device is sequentially rotated and moved, when the surroundings are dark and when the light source 130 is lit up, in the sequential order of the transmission regions 132R, 132G, and 132B and then the light-shaded colored regions 134R, 134G, and 134B, or when the surroundings are light and when the light source 130 is turned off, in the sequential order of the reflection regions 134R, 134G, and 134B and then the light-shaded colored regions 132R, 132G, and 132B. As a result of this, as is typically illustrated in FIG. 23, in each of the first, second, and third frames, for example, in the display of a moving picture that moves rightward in that figure, a black display necessarily appears, after the display of the three colors, like R→G→B→Black→R→G→B→Black.

Figure 24:
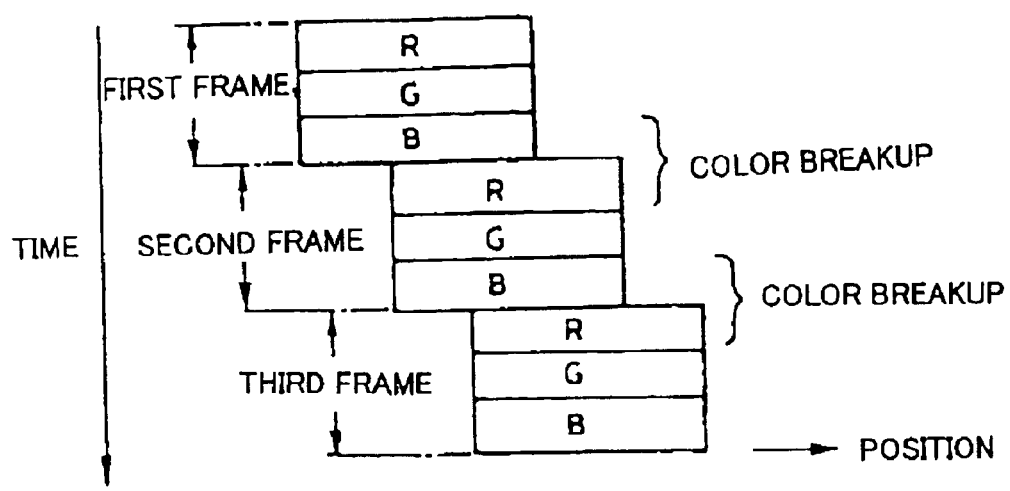
FIG. 24 is a schematic diagram, similar to that of FIG. 23, in the case where no light shading colored regions are provided on the semi-transmission/semi-reflection film.

By this, the so-called "color breakup" can be prevented. Namely, in a case where no light-shaded colored regions are provided and where no blanking periods for display of black colors are provided on the liquid crystal cell 112 side, when a similar moving-picture display to that described above is displayed, as illustrated in FIG. 24, the last color B in each frame and the initial color R in the next frame are inconveniently mixed together by the afterimage view phenomenon of the viewer's retina and it is therefore possible that the so-called "color breakup" phenomenon may occur. In contrast to this, in the semi-transmission/semi-reflection type color liquid crystal display device 170 according to this sixth embodiment, since the black color display is made by the light-shaded colored regions after displaying the respective colors of R, G, and B, it is impossible that the color breakup may occur.

(Seventh Embodiment: Semi-transmission/Semi-reflection Type Color Liquid Crystal Display Device)

Figure 25:
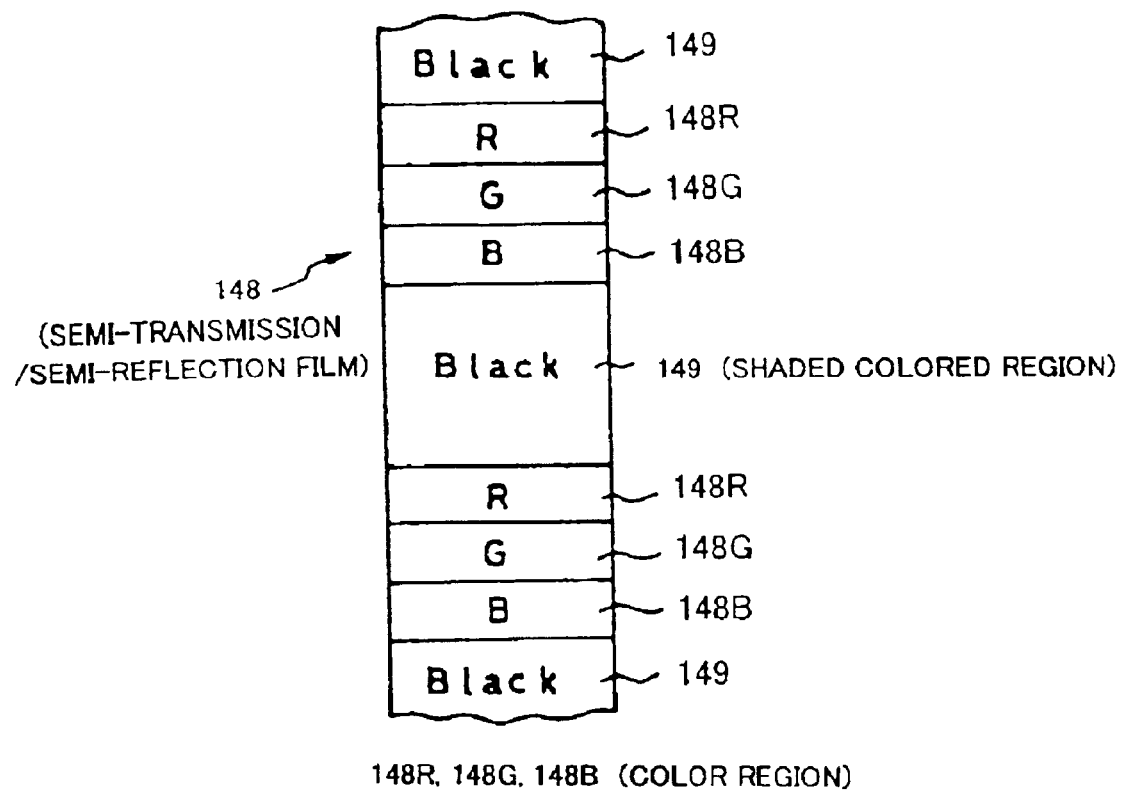
FIG. 25 is a developed view illustrating the semi-transmission/semi-reflection film according to a seventh embodiment of the present invention.

In the above-described sixth embodiment, the semi-transmission/semi-reflection region for forming the semi-transmitted/semi-reflected color light in any of the semi-transmission and semi-reflection films 118, 128, and 138 is only one with respect to each of the R, G, and B colors, but the present invention is not limited thereto. As in the seventh embodiment illustrated in FIG. 25, the R, G and B semi-transmission/semi-reflection regions and/or these regions and light-shaded colored region 149 may be set two sets or more in one semi-transmission/semi-reflection film 148.

In this case, the driving speed of the semi-transmission/semi-reflection film 148 can be made lower in proportion to the number of those settings, compared to that in any of the semi-transmission/semi-reflection color liquid crystal display devices 110, 140 and 170.

Further, while, in the above-described seventh embodiment, any of the semi-transmission/semi-reflection films 118, 128, and 138 is continuously driven by the motor 120C, the present invention is not limited thereto. For example, as in the case of a cinema film, that film may be fed on a frame by frame basis in units of a set of color and light-shaded colored region. In this case, as the motor 120C there may be used a pulse motor.

If, in this way, the reflection region and/or light-shaded colored region in the semi-transmission/semi-reflection film is intermittently driven for rotation, since the holding amount of time of that region can be obtained, the visual recognition of the screen can be greatly enhanced with a leap.

EXAMPLES

Fourth Example

First, by using a PET film having a thickness of 70 μm as the base member film and forming on it an aluminum layer of 60 nm, as the reflection layer, by the vacuum deposition method, a sheet was obtained. On this sheet, a photosensitive material that exhibits adhesion property by exposure of it to light was coated to form a photosensitive layer (the thickness: 1.5 μM).

Next, with respect to the photosensitive layer, ultraviolet rays were exposed via a photo-mask for use for the light-shading part. As the light source for exposure, an ultrahigh mercury lamp was used.

By doing so, there was formed a semi-transmission/semi-reflection sheet having color regions, the colors of that were three Y, M, and C colors. The width of the semi-transmission/semi-reflection sheet was made to be 40 mm and the lengths of the colored semi-transmission/semi-reflection regions were each made to be 27 mm.

Next, as the driving device, there were used a motor and two juxtaposed small-sized cylinders each consisting of a rotary supporter member attached to the motor, the two cylinders having wound therearound the endless band-like semi-transmission/semi-reflection film so that this film may be rotatable.

As the liquid crystal display panel, a TFT-LCD was adopted. The resolving power for display is 640×480 compliant to the VGA, and the display mode is OCB-mode. As the oriented film material for this LCD, SE7210 (manufactured by Nissan Chemical Industries, Ltd.) was selected and was coated onto the TFT substrate and its opposing substrate, with respect to that parallel rubbing processing was executed. Optically compensated films with a gap of 6 μm therebetween were disposed on both surfaces of the cell.

As the liquid crystal, LIXON TD-6004XX manufactured by CHISSO CORPORATION was adopted and then the display property thereof was measured. The rotation speed of each of the two cylinders was synchronized with the response time of the liquid crystal by the control device.

As a result of this, an excellent color display could be obtained.

Further, in any one of the fourth to seventh embodiments, the flickering of the light source did not occur during the display of the images, and, therefore, the changes in the light intensity at the time of a rising response and falling response, such as those in a case where using a short-afterglow light source such as an LED, did not occur, and a display that is gentle to the human eyes and that has a high visual recognition property could be obtained.

Since the present invention has been constructed as described above, it is possible to obtain a new field sequential display system of reflection type color liquid crystal display and a new field sequential display system of semi-transmission/semi-reflection type color liquid crystal display device. As a result, the excellent effect of especially highly increasing the lightness of the white display and at the same time therefore enabling such devices to be utilized in a battery-driven portable electronic appliance, etc. can be brought about.

What is claimed is:

1. A liquid crystal display device which performs display of an image by combining a color mixture and a field sequential color mixture made using micro time differences, wherein the color mixture is realized by generating color lights by combining color filters of a liquid crystal display element and a reflection film having a plurality of prescribed color regions such that the color filters and the reflection film overlap each other, and the field sequential color mixture using micro time differences is realized by synchronizing dark and light patterns of the reflection film with one or more colors displayed by the liquid crystal display element.

2. A color liquid crystal display device comprising:
 a liquid crystal cell including a pixel including three picture elements per frame of a screen respectively and having color filters of yellow, magenta, and cyan, wherein light transmittances of the three picture elements are displayed sequentially at least three times, and wherein a color display is produced by an additive color process of the light transmittances; and
 a reflection device that is disposed at the position where the light passing through the liquid crystal cell goes in, wherein the reflection device includes a reflection sheet having three-color reflection regions arranged to reflect the color lights corresponding to the yellow, magenta, and cyan, sequentially at least three times so that the reflection sheet may be moved to a position for selectively directing incident light toward the liquid crystal cell.

3. A color liquid crystal display device according to claim 2, wherein the three picture elements in the liquid crystal cell are controlled to have maximum transmittances when displaying a white color.

4. A color liquid crystal display device according to claim 2, wherein the three picture elements in the liquid crystal cell are controlled, in a case where a yellow color is displayed, so that during a time period in which a yellow color is reflected, all the three picture elements of yellow, magenta, and cyan may each have a maximum transmittance; so that during a time period in which the reflection region reflects the cyan, only the picture element of yellow may have a maximum transmittance; and so that during a time period in which the reflection region reflects the magenta, only the picture element of yellow may have a maximum transmittance.

5. A color liquid crystal display device according to claim 2, wherein the reflection sheet is in the form of an endless band on which the three-color reflection regions are disposed in a longitudinal direction of the reflection sheet; and further including a driving device around which the endless band-like reflection sheet is wound, the driving device including a motor for driving the roll for rotation, whereby the motor and the liquid crystal cell are arranged so that during a time period in which the motor moves the reflection sheet, a once-displayed display appears.

6. A color liquid crystal display device according to claim 2, wherein the liquid crystal cell is controlled by setting a blanking period that does not perform color display between the frames of a screen to be displayed; the reflection sheet including one set of reflection regions each of which includes a band-like low-reflectance reflection region being so arranged as to be moved in synchronism with the blanking period in the liquid crystal cell.

7. A color liquid crystal display device according to claim 6, wherein the low-reflectance reflection region is colored into a black color.

8. A color liquid crystal display device according to claim 6, wherein the length in a movement direction of the low-reflectance reflection region is 50 to 100% of the length in a movement direction of the one set of reflection regions.

9. A semi-transparent/semi-reflection type color liquid crystal display device comprising:
 a liquid crystal cell, including a pixel including three picture elements per frame of a screen respectively and having color filters of yellow, magenta, and cyan, wherein light transmittances of the three picture elements are displayed sequentially at least three times and wherein a color display is produced by an additive color process of the light transmittances; and
 a semi-transmission/semi-reflection device that is disposed at a position where external light passing through the liquid crystal cell goes in,
 wherein the semi-transmission/semi-reflection device includes a semi-transmission/semi-reflection sheet having three-color semi-transmission/semi-reflection regions arranged to reflect the color lights corresponding to the yellow, magenta, and cyan, a light source that is disposed between the semi-transmission/semi-reflection sheet and the liquid crystal cell to thereby optically radiate light from the rear surface of the liquid crystal cell so that the semi-transmission/semi-reflection sheet may be sequentially moved to a position for selectively transmitting incident light from the light source toward the liquid crystal cell and for selectively reflecting external light toward the liquid crystal cell.

10. A semi-transmission/semi-reflection type color liquid crystal display device according to claim 9, wherein the semi-transmission/semi-reflection sheet is in a form of an endless band on which two or more color regions that are colored into colors corresponding to the pixel are disposed and further including a driving device around which there is wound the endless band-like semi-transmission/semi-reflection sheet.

11. A semi-transmission/semi-reflection type color liquid crystal display device according to claim 9, wherein the semi-transmission/semi-reflection regions comprise a transmission region and a reflection region each of which includes an angle of inclination with respect to the movement direction.

12. A semi-transmission/semi-reflection type color liquid crystal display device according to claim 11, wherein the transmission and reflection regions are each shaped like a configuration extending in a direction perpendicular to the movement direction.

13. A semi-transmission/semi-reflection type color liquid crystal display device according to claim 12, wherein the transmission and reflection regions are each shaped like a zigzag configuration and turning points of this zigzag configuration are so arranged that at least one of the turning points overlaps upon a corresponding one of the picture elements in the liquid crystal cell.

14. A semi-transmission/semi-reflection type color liquid crystal display device according to claim 11, wherein the angle of inclination is from 10° to 80°.

15. A semi-transmission/semi-reflection type color liquid crystal display device according to claim 9, wherein the semi-transmission/semi-reflection regions comprise a transmission region and a reflection region each of which are disposed in a state of their being divided into beginning and ending sides.

16. A semi-transmission/semi-reflection type color liquid crystal display device according to claim 9, wherein the semi-transmission/semi-reflection regions comprise a transmission region and a reflection region and wherein a ratio of the area of the transmission region to the area of the reflection region is within a range of from 2:1 to 1:9.

* * * * *